United States Patent
Hiramatsu et al.

(10) Patent No.: US 6,289,064 B1
(45) Date of Patent: Sep. 11, 2001

(54) SYNCHRONIZATION EQUIPMENT

(75) Inventors: Katsuhiko Hiramatsu; Mitsuru Uesugi, both of Yokohama; Sadaki Futagi, Sagamihara; Hiroshi Suzuki; Hitoshi Yoshino, both of Yokosuka, all of (JP)

(73) Assignees: Matsushita Communication Industrial Co., Ltd., Yokohama; NTT Mobile Communication Network Inc., Tokyo, both of (JP)

( * ) Notice: Subject to any disclaimer, the term of this patent is extended or adjusted under 35 U.S.C. 154(b) by 0 days.

(21) Appl. No.: 08/810,767

(22) Filed: Mar. 5, 1997

(30) Foreign Application Priority Data

Mar. 7, 1996 (JP) .................................................. 8-050646
Mar. 7, 1996 (JP) .................................................. 8-050647

(51) Int. Cl.[7] ........................................................ H04L 7/00
(52) U.S. Cl. ......................... 375/365; 375/368; 375/208; 370/514
(58) Field of Search .............................. 375/365, 368, 375/208, 209, 210; 370/514

(56) References Cited

U.S. PATENT DOCUMENTS

| | | | |
|---|---|---|---|
| 3,766,315 | * 10/1973 | Couvillon, Jr. et al. | 178/69.41 R |
| 5,396,515 | * 3/1995 | Dixon et al. | 375/208 |
| 5,524,127 | * 6/1996 | Petranovich | 375/368 |
| 5,541,960 | * 7/1996 | Satomura et al. | 375/368 |
| 5,548,618 | * 8/1996 | Sehier et al. | 375/343 |
| 5,627,863 | * 5/1997 | Aslanis et al. | 375/357 |
| 5,648,991 | * 7/1997 | Namekata et al. | 375/341 |
| 5,680,421 | * 10/1997 | Shiino et al. | 375/368 |
| 5,724,381 | * 3/1998 | Endo et al. | 375/206 |
| 5,727,035 | * 3/1998 | Hiramatsu | 375/368 |
| 5,774,462 | * 6/1998 | Ishikawa et al. | 370/350 |

FOREIGN PATENT DOCUMENTS 669907   3/1994 (JP) .
7250120  9/1995 (JP) .

OTHER PUBLICATIONS

Office Action from the Korean Patent Office dated Jun. 10, 1999 and English translation.

* cited by examiner

Primary Examiner—Stephen Chin
Assistant Examiner—Mohammad Ghayour
(74) Attorney, Agent, or Firm—Stevens, Davis, Miller & Mosher, LLP

(57) ABSTRACT

A synchronization equipment performs correlation processing between a first known pattern included in a received signal and a second known pattern, and detects reception timing of the received signal. A correlation value computing portion computes a correlation value between the first known pattern and the second known pattern at every reception time. A reception timing detection portion compares the computed related value with a predetermined threshold value, determines the reception time when the correlation value becomes larger than the threshold value to be the reception timing of a received signal, and, after this determination, suspends the comparison between the correlation value and the threshold value, and holds the reception time determined to be the reception timing.

14 Claims, 17 Drawing Sheets

CORRELATION VALUE OF SYNCHRONOUS WORD IN CASE OF PRINCIPALLY LEAD WAVE

CORRELATION VALUE OF SYNCHRONOUS WORD IN CASE OF PRINCIPALLY DELAY WAVE

CORRELATION VALUE OF SYNCHROUS WORD WHEN LEAD WAVE AND DELAY WAVE ARE IN OPPOSITE PHASE AND PUT TOGETHER

CORRELATION VALUE OF SYNCHRONOUS WORD WHEN LEAD WAVE AND DELAY WAVE ARE IN-PHASE AND PUT TOGETHER

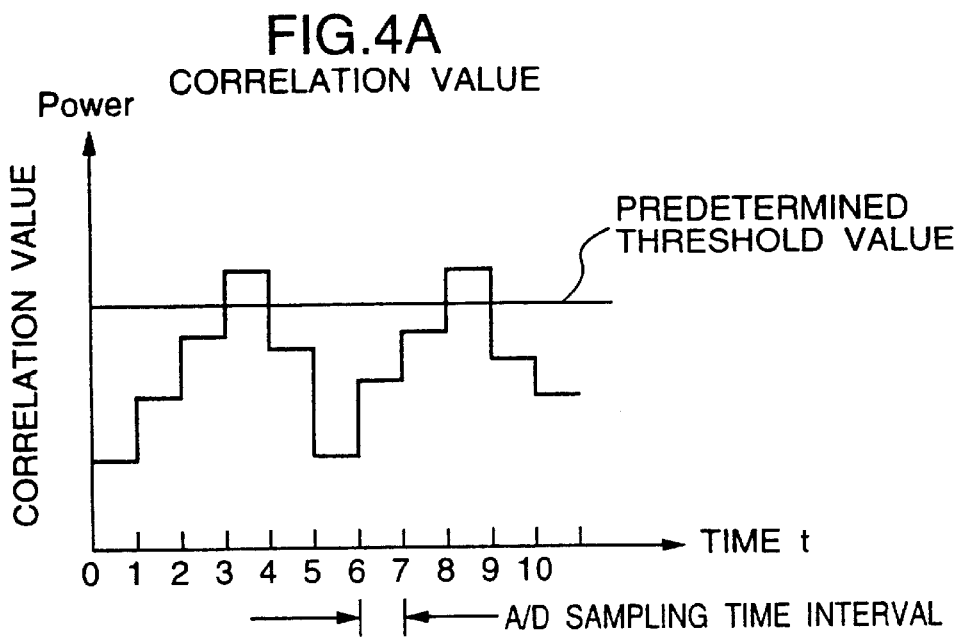
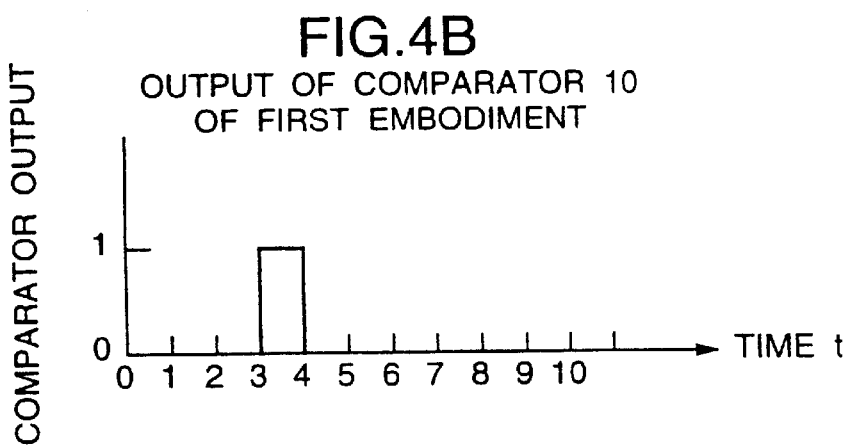
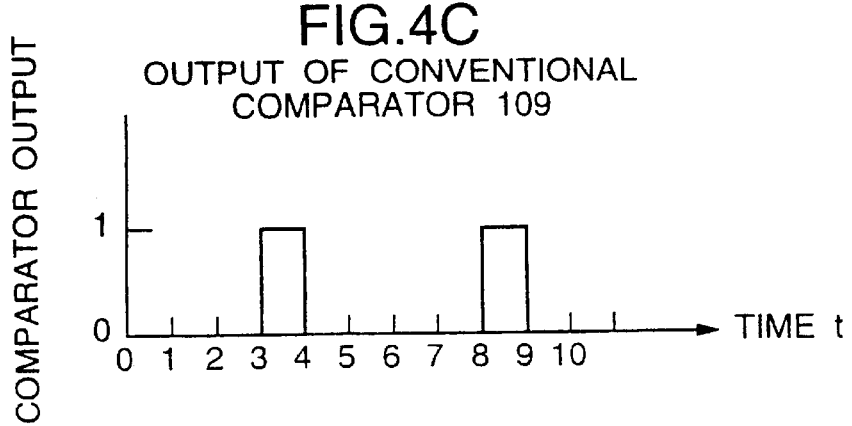

HISTOGRAM BEFORE UPDATE

HISTOGRAM AFTER UPDATE
(RECEPTION TIMING DETECTED AT TIME T3)

CORRELATION VALUE

OUTPUT OF COMPARATOR 33

TIMER VALUE
(WHEN MAXIMUM VALUE DETECTION WINDOW IS 4)

OUTPUT OF TIMER 34
(WHEN MAXIMUM VALUE DETECTION WINDOW IS 4)

OUTPUT OF MAXIMUM VALUE DETECTION CIRCUIT 35

FIG.10A CORRELATON VALUE
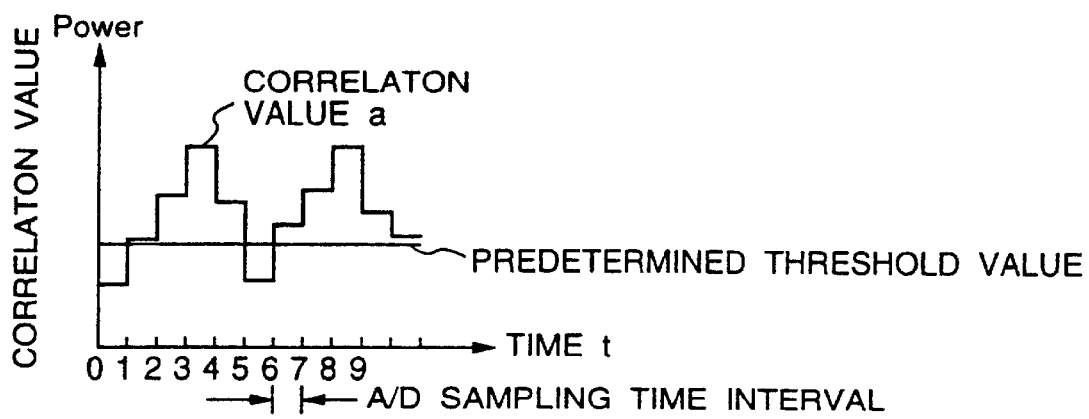
FIG.10B OUTPUT OF COMPARATOR 44
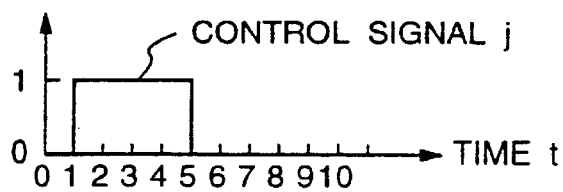
FIG.10C SWITCH CONTROL SIGNAL
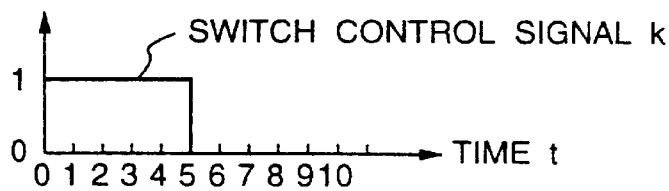
FIG.10D LATCH TIMING OF 1ST LATCH CIRCUIT 45
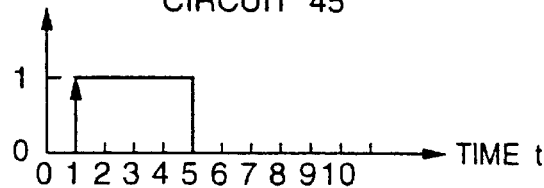
FIG.10E OUTPUT OF 1ST LATCH CIRCUIT 45
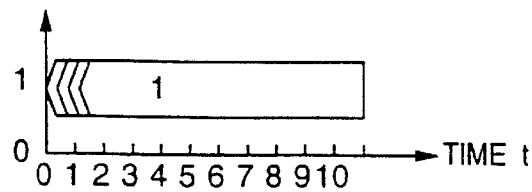
FIG.10F LATCH TIMING OF 2ND LATCH CIRCUIT 46
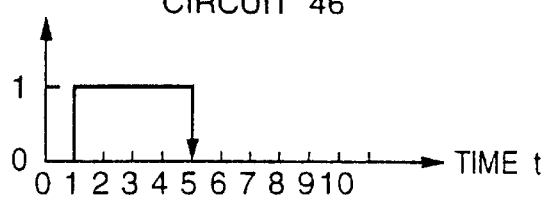
FIG.10G OUTPUT OF 2ND LATCH CIRCUIT 46
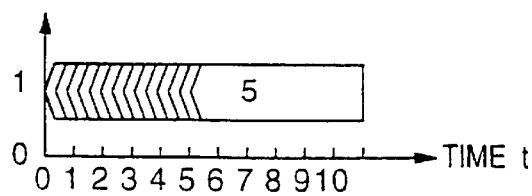

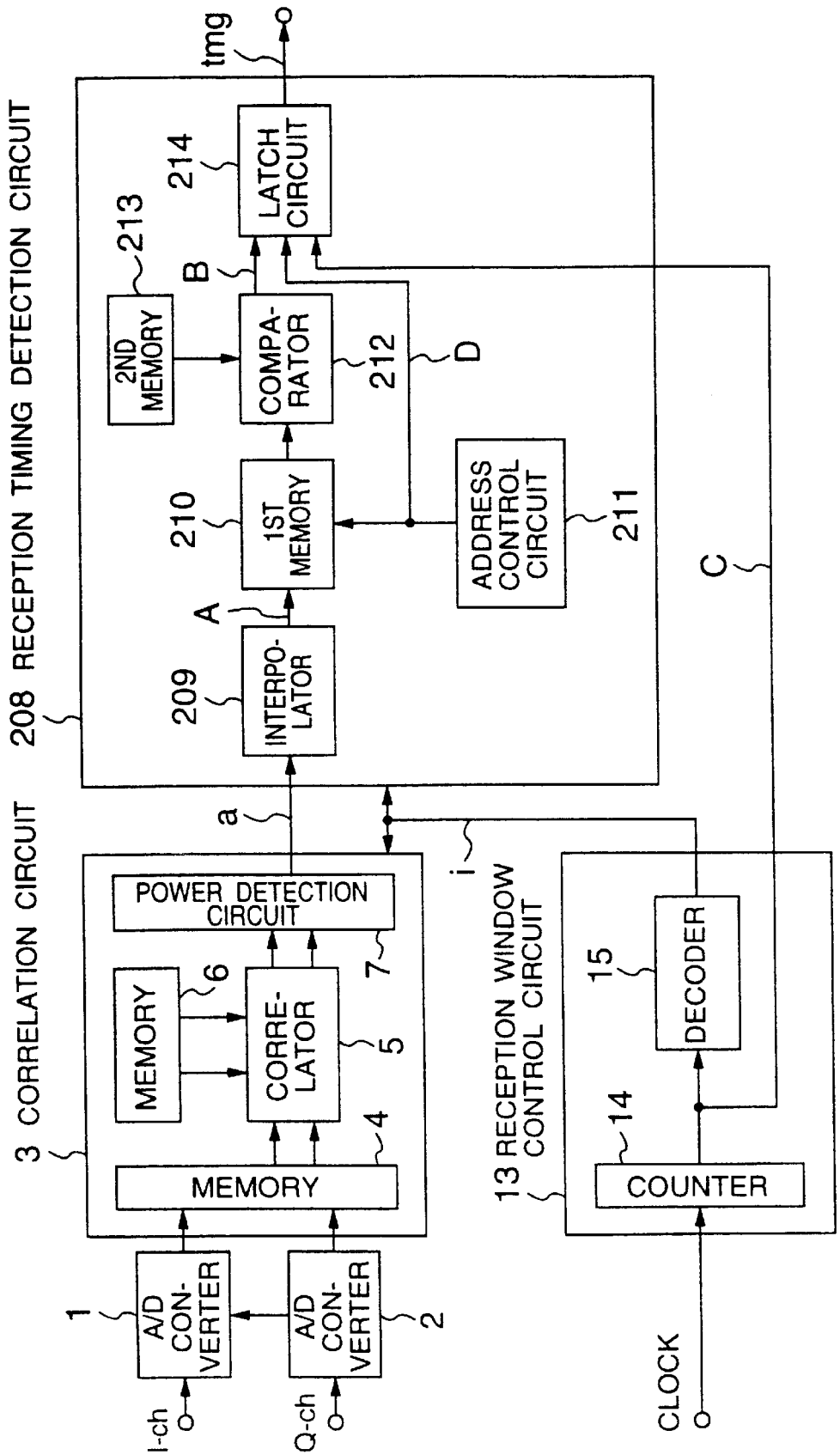

FIG.12A
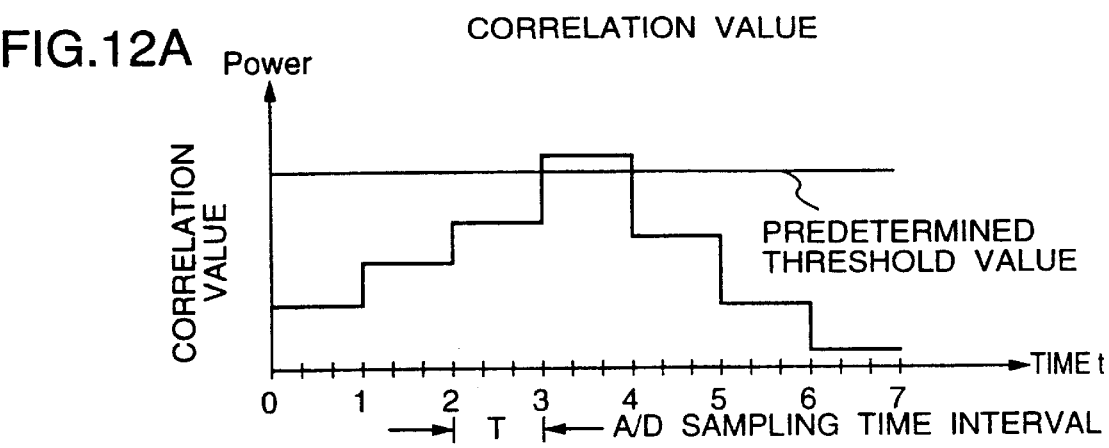
FIG.12B  OUTPUT OF CONVENTIONAL COMPARATOR
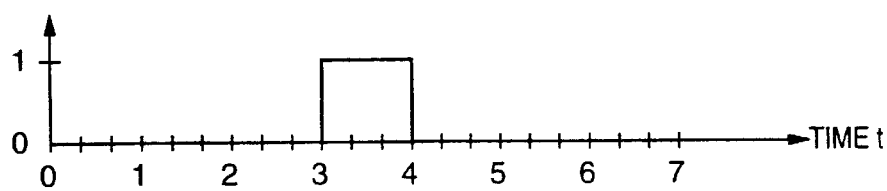
FIG.12C
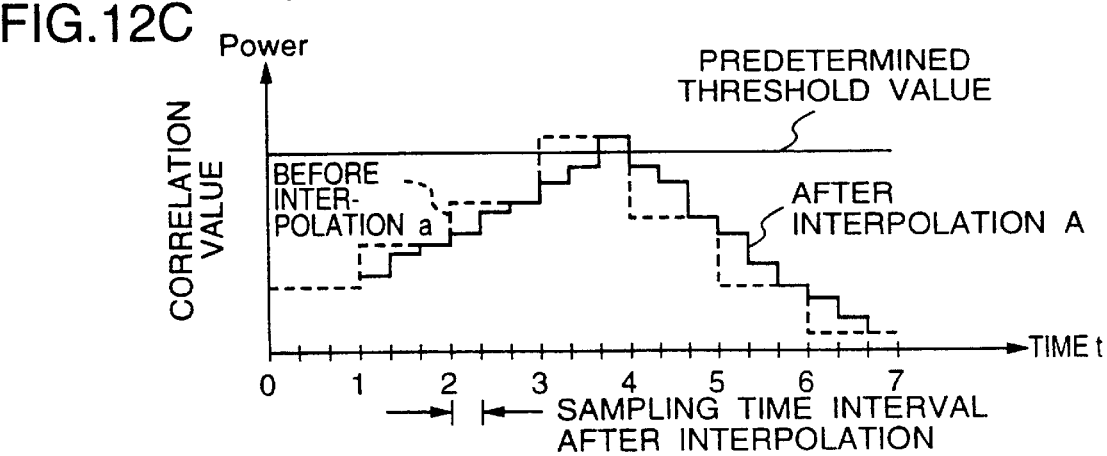
FIG.12D  COMPARATOR OUTPUT USING INTERPOLATION VALUE
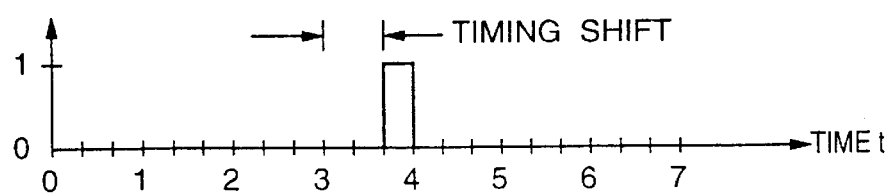

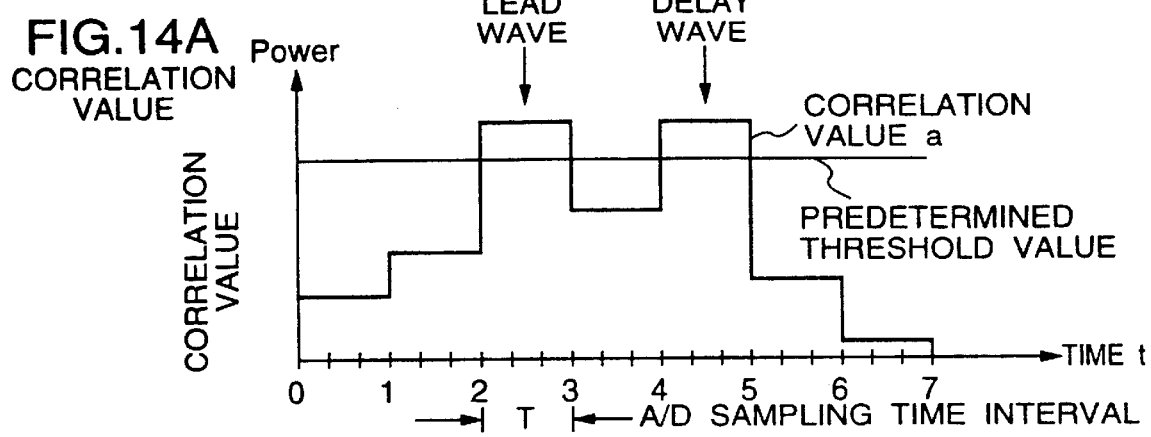
FIG.14A CORRELATION VALUE
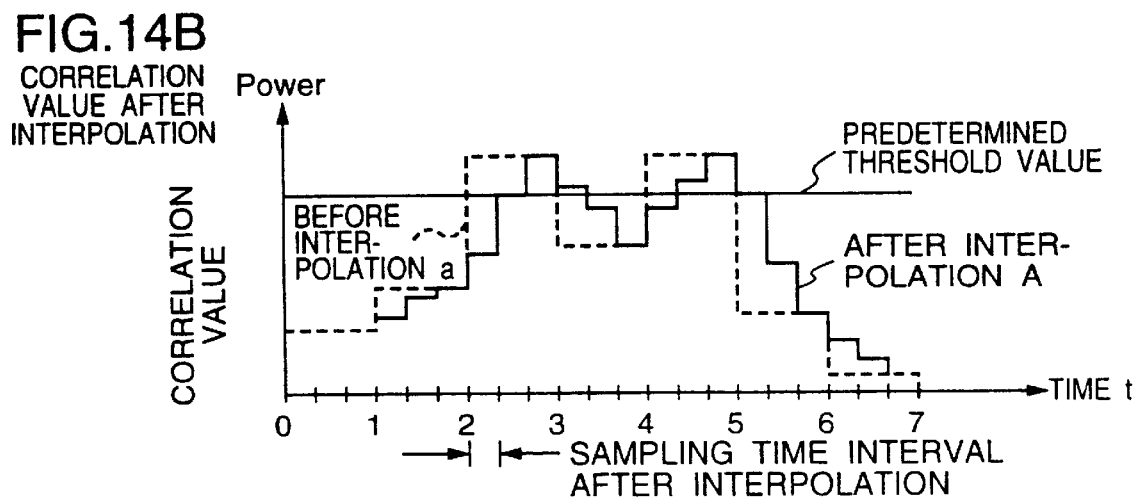
FIG.14B CORRELATION VALUE AFTER INTERPOLATION
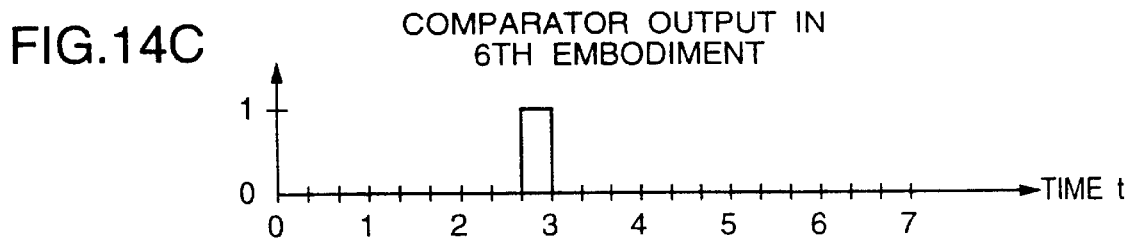
FIG.14C
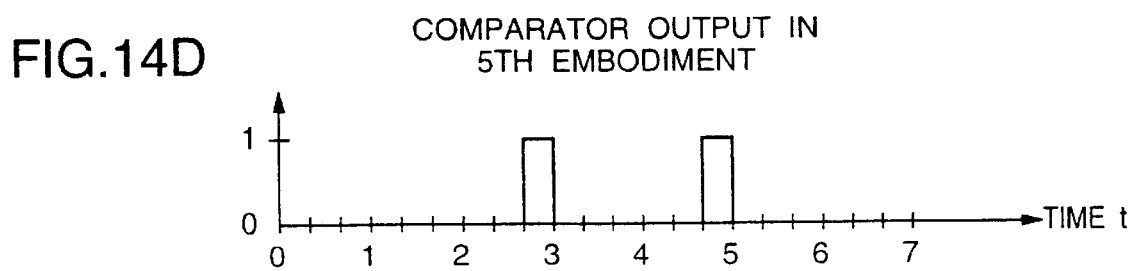
FIG.14D

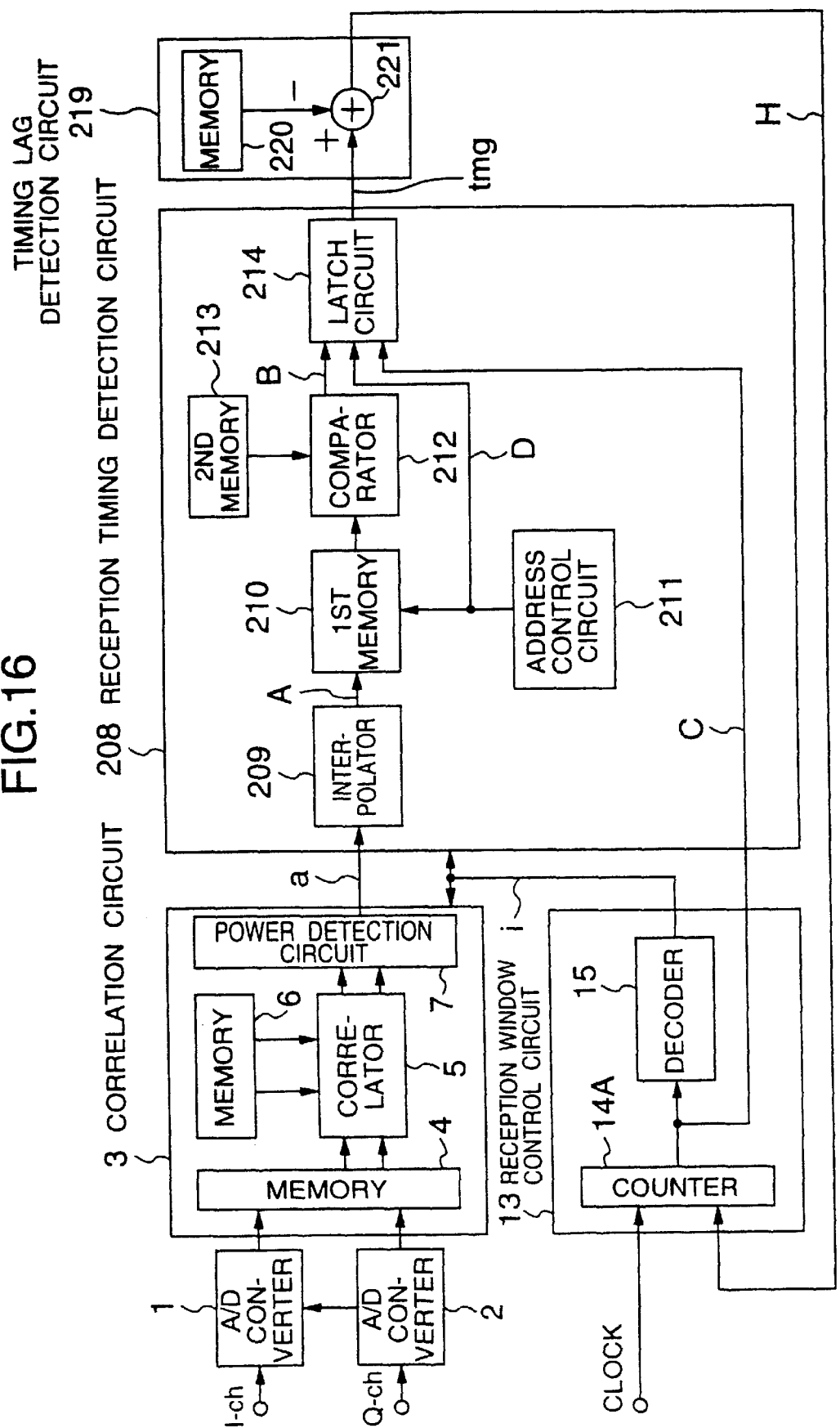

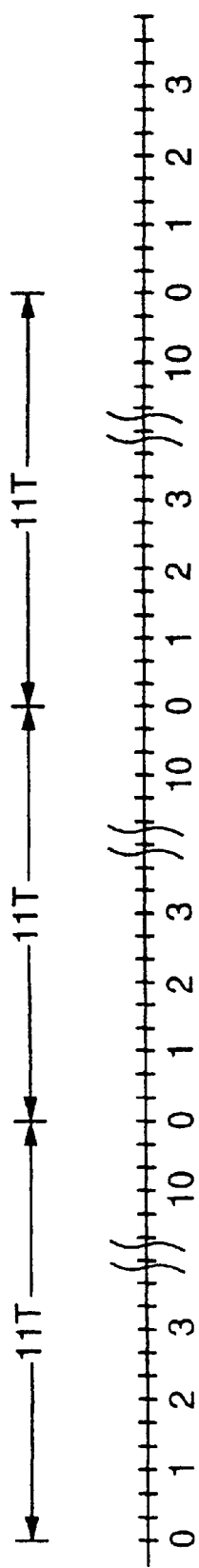
FIG.17A WHEN TIMING CORRECTION IS NOT MADE
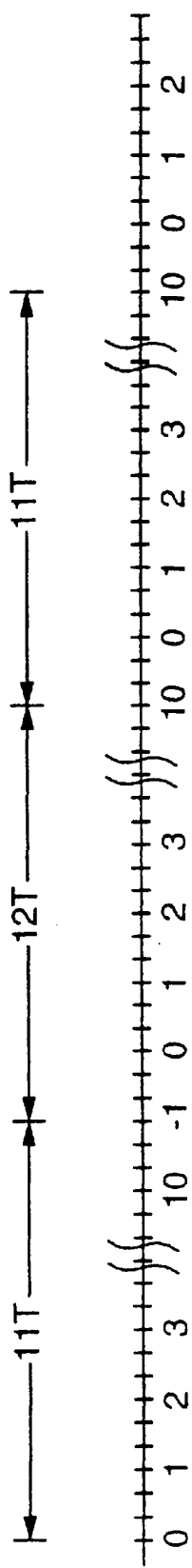
FIG.17B WHEN TIMING CORRECTION IS MADE BY 1T BACKWORD
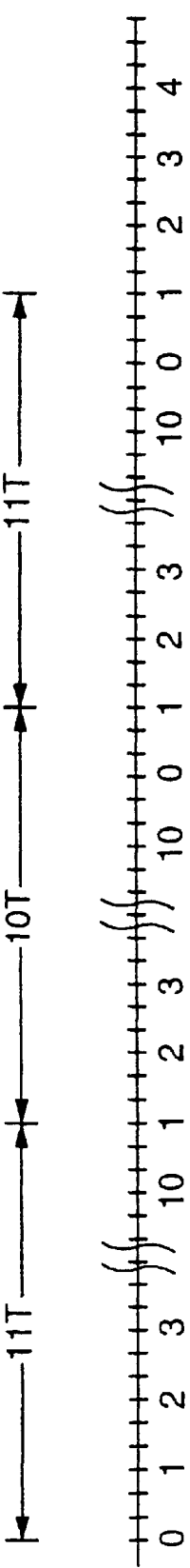
FIG.17C WHEN TIMING CORRECTION IS MADE BY 1T FRONTWORD

SYNCHRONIZATION EQUIPMENT

BACKGROUND OF THE INVENTION

1. Field of the Invention

The present invention relates to a synchronization equipment used in digital communication.

2. Description of the Related Art

Conventionally, in this sort of synchronization equipment, a correlation value of a known pattern formed from a known symbol included in a received signal with a known pattern belonging to a receiver is computed, and it is decided that the known pattern has been detected when the computed correlation value becomes larger than a predetermined threshold value (disclosed in JP-A-7-250120 for instance).

This sort of synchronization equipment includes, as shown in FIG. 1, first and second analog-to-digital converters 101 and 102 to which in-phase components I-ch and orthogonal components Q-ch of a received signal obtained by synchronous detection of the received signal are inputted, respectively, a correlation circuit 103 to which the output signals of the first and second A/D converters 101 and 102 are inputted, and a reception timing detection circuit 108 to which the output signal of the correlation circuit 103 is inputted. Here, the correlation circuit 103 includes a first memory 104 for storing the in-phase components I-ch and the orthogonal components Q-ch of M pieces of received signals having known patterns inputted from the first and second A/D converters 101 and 102, a correlator 105 to which two output signals of the first memory 104 are inputted, a second memory 106 where in-phase components and orthogonal components of known patterns belonging to the receiver are stored, and a power detection circuit 107 to which two output signals of the correlator 105 are inputted. Further, the reception timing detection circuit 108 includes a memory 110 where a predetermined threshold value is stored, and a comparator 109 for comparing the output signal of the correlation circuit 103 and the threshold value stored in the memory 110 with each other.

In this synchronization equipment, the in-phase components I-ch and the orthogonal components Q-ch of the received signal obtained by the synchronous detection of the received signal are quantized by the first and second A/D converters 101 and 102, and stored thereafter in the first memory 104 of the correlator circuit 103. In the first memory 104, the in-phase components I-ch and the orthogonal components Q-ch of M pieces of received signals having the known pattern can be stored by the fact that the in-phase components I-ch and the orthogonal components Q-ch of the received signal stored most previously are superscribed by the in-phase components I-ch and the orthogonal components Q-ch of a newly inputted received signal.

In the correlator 105 of the correlation circuit 103, two correlation values $comb_I$ and $comb_Q$ are computed with the following expressions using the in-phase components I-ch and orthogonal components Q-ch of the received signal outputted from the first memory 104 and the in-phase components and orthogonal components of the known pattern outputted from the second memory 106.

$$comb_I = \text{Re}\left[\sum_{i=1}^{M} sw(i) \times r(i)^*\right] \quad (1)$$

$$= \sum_{i=1}^{M} \{sw_I(i) \times r_I(i) + sw_Q(i) \times r_I(i)\}$$

$$comb_Q = \text{Im}\left[\sum_{i=1}^{M} sw(i) \times r(i)^*\right] \quad (2)$$

$$= \sum_{i=1}^{M} \{-sw_Q(i) \times r_Q(i) + sw_I(i) \times r_Q(i)\}$$

Two correlation values $comb_I$ and $comb_Q$ computed in the correlator 105 are converted into one correlation value (power) comb by being processed in accordance with the following expression in the power, detection circuit 107.

$$comb = comb_I^2 + comb_Q^2 \quad (3)$$

Besides, in the above-described expressions (1) to (3), inferior letters I and Q show in-phase components and orthogonal components, respectively. Further, respective processings shown in the above-described expressions (1) to (3) can be realized simply by means of a software of a signal processor such as DSP.

The correlation value obtained in the correlation circuit 103 is compared with the threshold value which has been stored in the third memory 110 in the comparator 109 of the reception timing detection circuit 108. When the correlation value obtained by the correlation circuit 103 is larger than this threshold value, it is decided that the known symbol has been received.

Besides, the correlation value is normalized with the power of the received signal sometimes in order to oppress power variation of the correlation value by fading, but a structure in the case such normalization is not made is shown here.

In a synchronization equipment such as described above, however, there are such problems as shown hereunder.

(1) Generally, when transmission is made including a known symbol train in a transmission signal, the correlation value shows the largest at the time when a transmitter transmits the known symbol train in an ideal state when the correlation between this known symbol train and the known symbol train belonging to a receiver is obtained. However, even when optimum timing is going to be detected from a fact that the correlation value simply becomes larger than a certain value or from a peak of the correlation value, the synchronization equipment does not necessarily operate smoothly when the received wave (hereinafter referred to as a "delay wave") which is received after reflected by a building or a mountain is in existence.

Namely, the correlation values when such a delay wave exists are shown in FIGS. 2A to 2D for instance. When only a desired received wave (hereinafter referred to as a "lead wave" or a "desired wave") exists, it is possible to obtain timing which coincides with the lead wave accurately as shown in FIG. 2A. Further, when only a delay wave exists, it is possible to obtain timing which coincides with the delay wave accurately as shown in FIG. 2B. However, when the lead wave and the delay wave are in opposite phases and added to each other, the correlation value becomes small. Therefore, as shown in FIG. 2C, when the threshold value is made slightly larger, both the timing of the lead wave and the timing of the delay wave become no longer be detected. On the other hand, when the lead wave and the delay wave are in-phase and added to each other, the peak of the correlation value is detected at both of the reception time of the lead wave and the reception the of the delay wave. Therefore, as shown in FIG. 2D, the timing of the delay wave is detected only by the comparison with the threshold value.

(2) The detection accuracy of the reception timing is not so high. Namely, the detection accuracy of the reception timing depends on a sampling speed of the A/D converter, and it is when the lag between a transmitter and a receiver reaches T/2 (T: sampling time interval) that the detection accuracy is detected as a timing lag. When the sampling time interval is large, the timing lag becomes large, and the reception Performance is deteriorated. Further, when the frequency discrepancy between the transmitter and the receiver is small even in case the sampling time interval is not so large, it takes time until the timing lag is detected and a state that the reception performance has been deteriorated to some extent continues for a long time duration.

SUMMARY OF THE INVENTION

It is an object of the present invention to provide a synchronization equipment which is capable of detecting reception time of a lead wave even when the lead wave and a delay wave exist at the same time in view of the problems described in the above item (1).

It is another object of the present invention to provide a synchronization equipment which is capable of detecting reception timing with high accuracy in view of the problems described in the above item (2).

A first synchronization equipment of the present invention is a synchronization equipment for performing correlation processing between a first known pattern included in a received signal and a second known pattern to detect reception timing of the received signal, which comprises:

correlation value computing means for computing a correlation value between the first known pattern and the second known pattern;

reception timing detecting means; and reception window control means for sending reception time to the correlation means and the reception timing detection means; wherein:

the correlation value computing means computes the correlation value at every reception time; and the reception timing detection means compares the computed correlation value with a predetermined threshold value, decides the reception time when the computed correlation value becomes larger than the threshold value to be the reception timing of the received signal, suspends the comparison of the correlation value with the threshold value after the decision, and holds the reception time decided as the reception timing.

A second synchronization equipment is the first synchronization equipment of the present invention described above, which further comprises timing correction value detection means for drawing up a histogram of reception time held in the latch circuit, compares the frequency of the reception time in the drawn up histogram with another threshold value, and generating a timing correction value for correcting the reception time sent by the reception window control means in accordance with the reception time when the frequency exceeds another threshold value.

A third synchronization equipment of the resent invention is a synchronization equipment for performing correlation processing between a first known pattern included in a received signal and a second known pattern to detect reception timing of the received signal, which comprises:

correlation value computing means for computing a correlation value between the first known pattern and the second known pattern;

reception timing detection means; and reception window control means for sending reception time to the correlation means and the reception timing detection means; wherein the correlation value computing means computes the correlation value at every reception time; and the reception timing detection means compares the computed correlation value with a predetermined threshold value, detects the reception time when the computed correlation value becomes larger than the threshold value, and obtains the reception time when the correlation value computed by the correlation value computing means becomes the largest during a certain period after the detected reception time and holds the reception time.

A fourth synchronization equipment of the present invention is a synchronization equipment for performing correlation processing between a first known pattern included in a received signal and a second known pattern to detect reception timing of the received signal, which comprises:

correlation value computing means for computing a correlation value between the first known pattern and the second known pattern;

reception timing detection means; and reception window control means for sending reception time to the correlation means and the reception timing detection means; wherein:

the correlation value computing means computes the correlation value at every reception time; and the reception timing detection means compares the computed correlation value with a predetermined threshold value, detects first reception time when the computed correlation value has become larger than the threshold value for the first time and second reception time when the computed correlation value has become smaller than the threshold value for the first time after the first reception time, and obtains a mean value of the first reception time and the second reception time and holds the mean value.

A fifth synchronization equipment of the present invention is a synchronization equipment for performing correlation processing between a first known pattern included in a received signal and a second known pattern to detect reception timing of the received signal, which comprises:

correlation value computing means for computing a correlation value between the first known pattern and the second known pattern;

reception timing detection means; and reception window control means for sending reception time to the correlation means and the reception timing detection means; wherein:

the correlation value computing means computes the correlation value at every reception time; and the reception timing detection means interpolates the computed correlation value, compares the correlation value after the interpolation with a predetermined threshold value, deciders the reception time when the correlation value after the interpolation becomes larger than the threshold value to be the reception timing of the received signal.

A sixth synchronization equipment of the present invention is the fifth synchronization equipment of the present invention, in which the reception timing detection means comprises means which sustains comparison of the correlation value after the interpolation with the threshold value after deciding the reception time, and holds the reception time determined to be the reception timing.

A seventh synchronization equipment of the present invention is the fifth or sixth synchronization equipment of the present invention, further comprises timing lag detection means provided on the output side of the reception timing detection means, wherein the timing lag detection means comprises storage means where optimum reception time is stored and adding means for obtaining the difference between the reception time held by the reception timing detecting means and the optimum reception time.

An eighth synchronization equipment of the present invention is the seventh synchronization equipment of the present invention, wherein the reception window control means comprises a counter for counting a clock and also being set an initial value in accordance with an output signal of the timing lag detection means.

BRIEF DESCRIPTION OF THE DRAWINGS

FIGS. 4A to 4C are timing charts for explaining the operation of the synchronization equipment shown in FIG. 3;

FIGS. 10A to 10G are timing charts for explaining the operation of the synchronization equipment shown in FIG. 9;

FIG. 11 is a block diagram of a synchronization equipment according to a fifth embodiment of the present invention;

FIGS. 12A to 12D are timing charts for explaining the operation of the synchronization equipment shown in FIG. 11;

FIGS. 14A to 14D are timing charts for explaining the operation of the synchronization equipment shown in FIG. 13;

FIG. 16 is a block diagram of a synchronization equipment according to an eighth Embodiment of the present invention; and FIGS. 17A to 17C are timing charts for explaining the operation of the synchronization equipment shown in FIG. 16.

DESCRIPTION OF THE PREFERRED EMBODIMENTS (The first embodiment)

Figure 3:
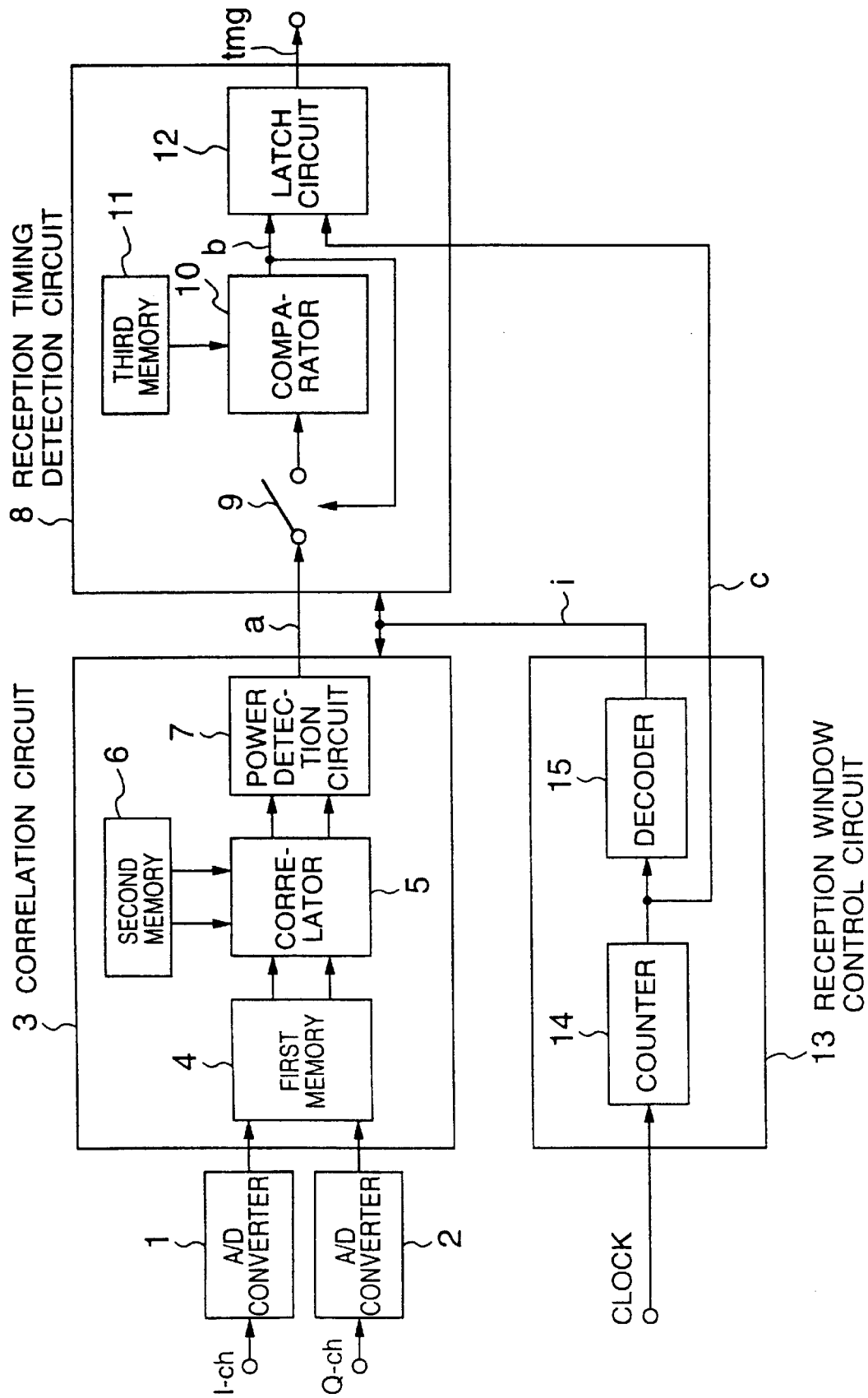
FIG. 3 is a block diagram of a synchronization equipment according to a first embodiment of the present invention.

A synchronization equipment according to a first embodiment of the present invention includes, as shown in FIG. 3, first and second analog-to-digital converters (A/D converters) 1 and 2, a correlation circuit 3, a reception timing detection circuit 8, and a reception window control circuit 13. The first and second A/D converters 1 and 2 quantize in-phase components I-ch and orthogonal components Q-ch of a received signal obtained by synchronous detection of the received signal, respectively. The correlation circuit 3 computes a correlation value a between a known symbol pattern included in the output signals of the first and second A/D converters 1 and 2 and a known pattern belonging to a receiver, and includes a first memory 4 in which the in-phase components I-ch and orthogonal components Q-ch of the received signal inputted from the first and second A/D converters 1 and 2, respectively, are stored, a correlator 5 to which two output signals of the first memory 4 are inputted, a second memory 6 in which in-phase components I-ch and orthogonal components Q-ch of the known pattern of the receiver are stored, and a power detection circuit 7 to which two output signals of the correlator 5 are inputted. The reception timing detection circuit 8 decides that the known pattern in the received signal has been detected when the correlation value a computed in the correlation circuit 3 becomes larger than a predetermined threshold value, and includes a third memory 11 where the predetermined threshold value has been stored, a comparator 10 for comparing the output signal of the correlation circuit 3 with the predetermined threshold value stored in the memory 11, a switch 9 provided between the power detection circuit 7 and the comparator 10 and opening and closing of which is controlled by a timing correction control signal b outputted from the comparator 10, and a latch circuit 12 for latching a counter value c of a counter 14 described later of the reception window control circuit 13 by a timing correction control signal b outputted from the comparator 10. The reception window control circuit 13 operates the correlation circuit 3 and the reception timing detection circuit 8 only for a certain period of time, and includes the counter 14 to which a clock is inputted from the outside, and a decoder 15 for generating a timing detection window signal i which operates the correlation circuit 3 and the reception timing detection circuit 8 when the counter value c of the counter 14 shows a value of the time when the known symbol is received.

In the synchronization equipment of the present embodiment, the number of clocks inputted from the outside is counted with the counter 14 of the reception window control circuit 13. Here, the count period of the counter 14 is the same as the reception interval of the known symbol. In the decoder 15, a timing detection window signal i is generated when the counter value c of the counter 14 shows a value of the time when the known symbol is received, and the correlation circuit 3 and the reception timing detection circuit 8 become operable only for the period that this timing detection window signal i is being generated.

The in-phase components I-ch and the orthogonal components Q-ch of the received signal obtained by the synchronous detection of the received signal are quantized by the first and second A/D converters 1 and 2, and stored thereafter in the first memory 4 of the correlation circuit 3. In the first memory 4, in-phase components I-ch and orthogonal components Q-ch of M pieces of received signals having the known pattern can be stored, and the in-phase components I-ch and orthogonal components Q-ch of the received signal stored most previously are superscribed -with in-phase components I-ch and orthogonal components Q-ch of a newly inputted received signal. In the correlator 5 of the correlation circuit 3, two correlation values are computed with the above-mentioned expressions (1) and (2) using in-phase components I-ch and orthogonal components Q-ch of the received signal outputted from the first memory 4 and in-phase components and orthogonal components of the known pattern included in the receiver that are outputted from the second memory 6. Two correlation values computed in the correlator 5 are converted into one correlation value (power) a by being processed in the power detection circuit 7 in accordance with the above-mentioned expression (3).

The correlation value a obtained in the correlation circuit 3 is inputted to the comparator 10 through the switch 9 of the reception timing detection circuit 8, and is compared with a predetermined threshold value stored in the third memory 11. When the correlation value a obtained in the correlation circuit 3 is larger than this predetermined value, it is determined that the known symbol has been received, and the timing correction control signal b is outputted from the comparator 10. When the timing correction control signal b is outputted from the comparator 10, the switch 9 is brought into an open state, and the detection of the known symbol is sustained. Further, when the timing correction control signal b is inputted to the latch circuit 12, the counter value c of the counter 14 of the reception window control circuit 13 is introduced into the latch circuit 12. Since the switch 9 is kept in an open state hereafter, the correlation value a is never inputted to the reception timing detection circuit 8 from the correlation circuit 3, but the counter value c of the counter 14 which has been introduced in the latch circuit 12 is outputted as reception time tmg.

For example, as shown in FIG. 4A, when a lead wave and a delay wave are in existence and there are peaks of the correlation value larger than the predetermined threshold value at reception time t3 of the lead wave and reception time t8 of the delay wave in the reception window, the performance of equalization processing becomes better when the timing is adapted to the lead wave in general in an equalizer or the like that performs equalization processing of received data utilizing the reception timing detected in the synchronization equipment.

In the synchronization equipment according to the present embodiment, since the correlation value a computed in the correlation circuit 3 becomes larger than the predetermined threshold value at the reception time t3 of the lead wave, the timing correction control signal b is outputted from the comparator 10 at the reception time t3 of the lead wave as shown in FIG. 4B. Since the switch 9 is brought to an open state by the timing correction control signal b at this time t3 and thereafter, the correlation value a computed in the correlation circuit 3 is never inputted to the comparator 10. As a result, the timing correction control signal b will never be outputted from the comparator 10 at the reception time t8 of the delay wave. Accordingly, in the synchronization equipment according to the present embodiment, it is possible to detect only the reception time of the lead wave even when there are peaks of correlation value larger than the predetermined threshold value at the reception time t3 of the lead wave and the reception time t8 of the delay wave in the reception window.

Figure 1:
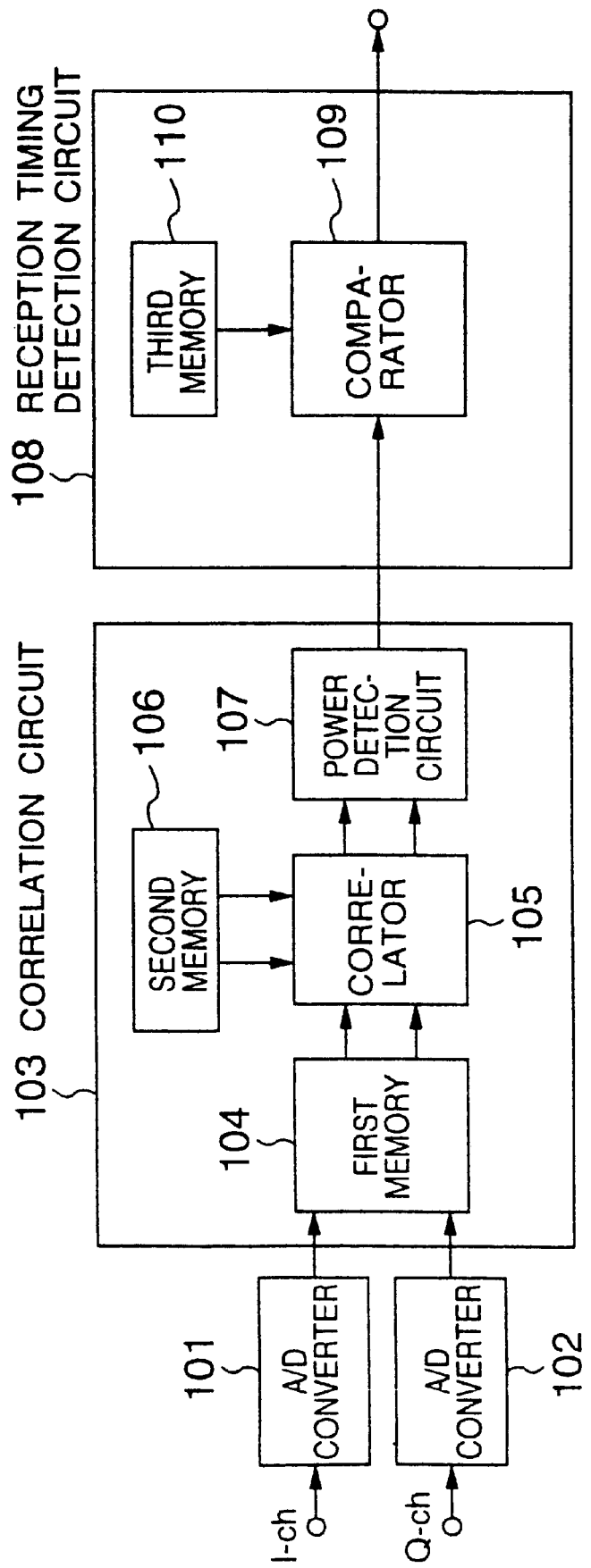
FIG. 1 is a block diagram showing a conventional synchronization equipment.
Figure 2A:
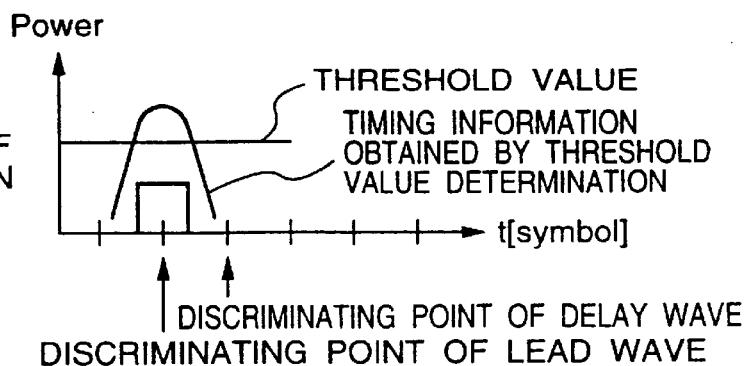
FIGS. 2A to 2D show timing charts for explaining the operation of the synchronization equipment shown in FIG. 1.
Figure 2B:
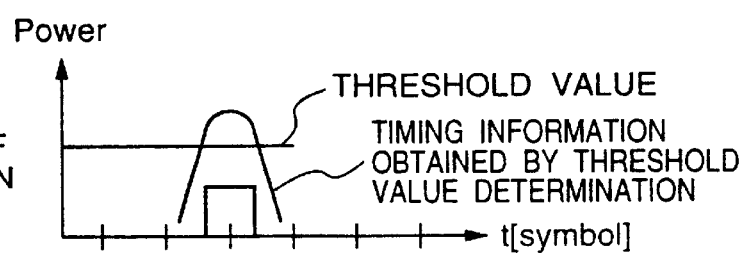
Figure 2C:
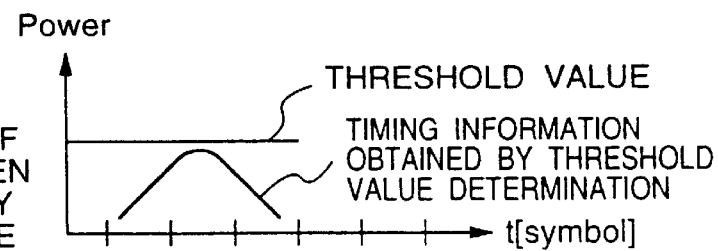
Figure 2D:
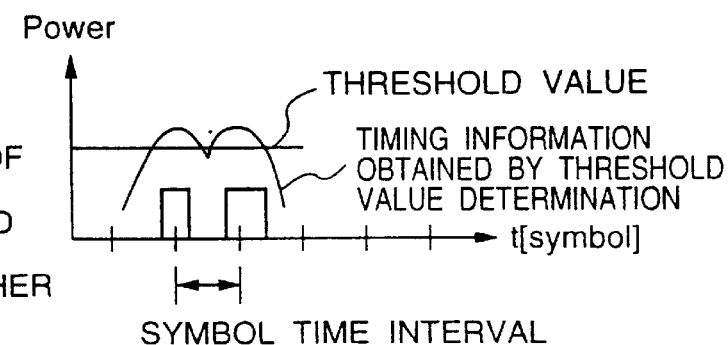

On the other hand, in the conventional synchronization equipment shown in FIG. 1, when there are peaks of correlation value larger than the predetermined threshold value at the reception time t3 of the lead wave and the reception time t8 of the lead wave in the reception window, the timing correction control signal b is outputted from the comparator 109 at the reception time t3 of the lead wave and at the reception time t8 of the delay wave as shown in FIG. 4C. Therefore, the reception timing is locked midway between the lead wave and the delay wave, thus producing the worst timing for the equalizer.

Since there are provided, in the synchronization equipment according to the present embodiment, the switch 9 for suspending detection of the known symbol when the known symbol is received and thereafter, and the latch circuit 12 for holding the time when the known symbol is received in the reception timing detection circuit 8 as described above, it is possible to detect only the reception time of the lead wave surely even when the lead wave and the delay wave are in existence and there are the peaks of the correlation value larger than the predetermined threshold values in the reception window.

(The second embodiment)

Figure 5:
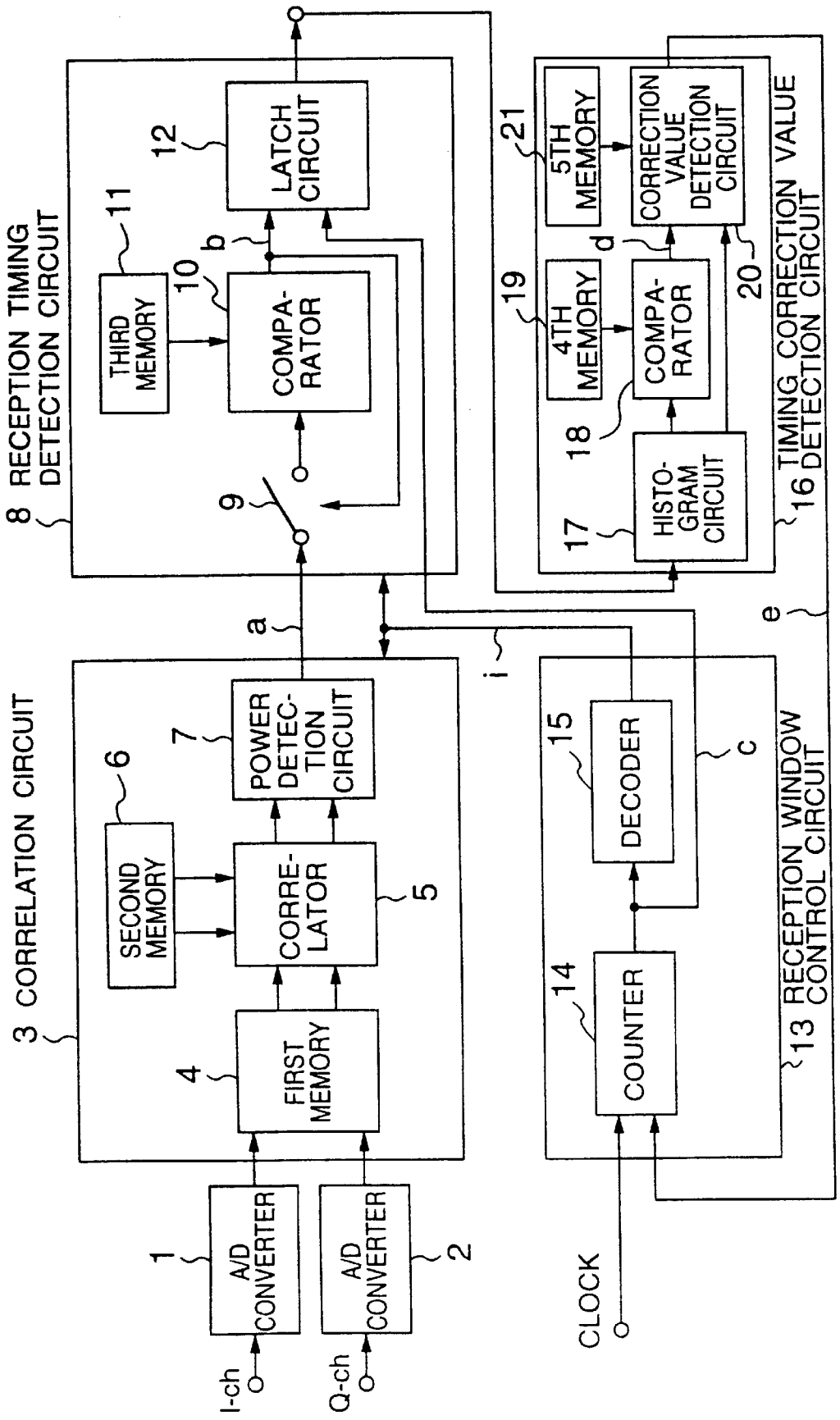
FIG. 5 is a block diagram of a synchronization equipment according to a second embodiment of the present invention.

A synchronization equipment according to a second embodiment of the present invention is different from the synchronization equipment according to the first embodiment shown in FIG. 3 in that a timing correction value detection circuit 16 is provided as shown in FIG. 5. The timing correction value detection circuit 16 includes a histogram circuit 17 to which the output signal of the latch circuit 12 of the reception timing detection circuit 8 is inputted, a fourth memory 19 in which a threshold value with respect to the frequency of reception timing has been stored, a comparator 18 for comparing the output signal of the histogram circuit 17 with the threshold value stored in the fourth memory 19, a fifth memory 21 in which the optimum reception time has been stored, and a correction value detection circuit 20 to which the output signal of the histogram circuit 17, the output signal (timing control signal d) of the comparator 18 and the optimum reception time stored in the fifth memory 21 are inputted, and the output signal (counter correction value e) of the correction value detection circuit 20 is inputted to the counter 14 of the reception window control circuit 13.

Figure 6A:
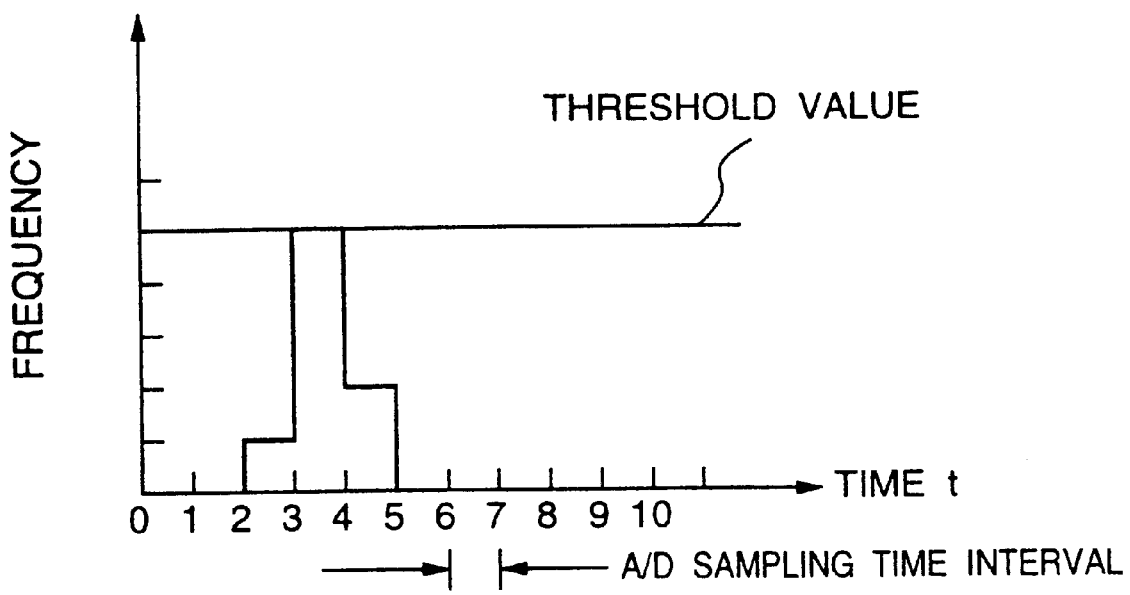
FIGS. 6A and 6B are timing charts for explaining the operation of the synchronization equipment shown in FIG. 5.
Figure 6B:
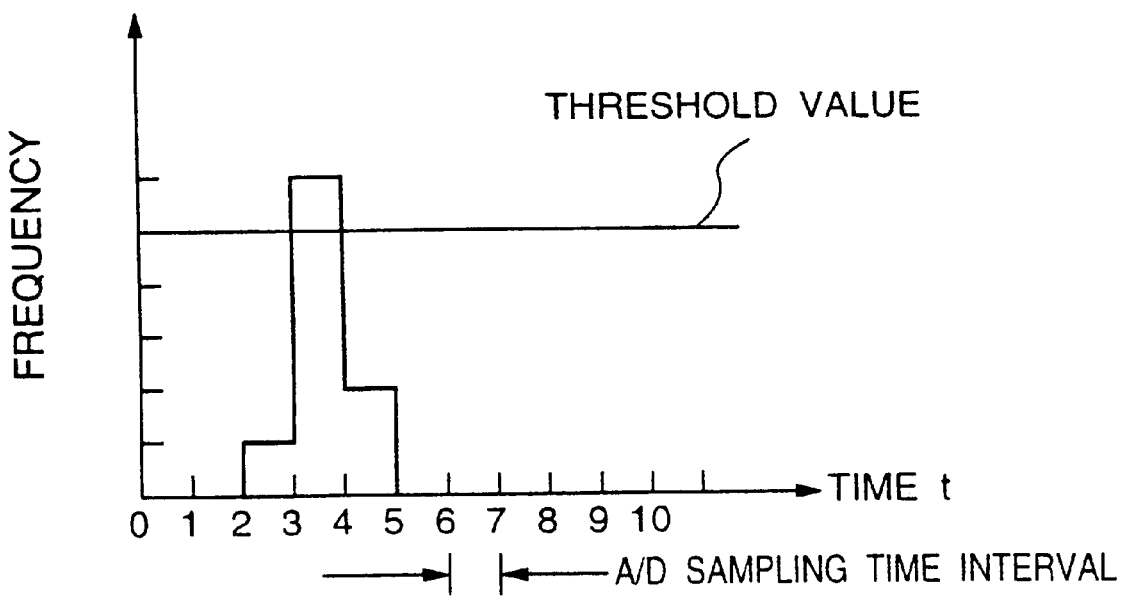

Since the operation of the first and second A/D converters 1 and 2, the correlation circuit 3 and the reception timing detection circuit 8 in the synchronization equipment according to the present embodiment is similar to that of the synchronization equipment according to the first embodiment described above, the operation of the timing correction value detection circuit 16 and the reception window control circuit 13 related thereto will be described in detail hereinafter with reference to FIGS. 6A and 6B.

In the histogram circuit 17 of the timing correction value detection circuit 16, the frequency of the reception timing is computed using the output signal of the latch circuit 12 of the reception timing detection circuit 8. For example, it is assumed that the histogram of the reception timing before update has the maximum value at time t3 as shown in FIG. 6A. When the newly detected reception timing is also at the time t3, 1 is added to the frequency at the time t3 until the last time in the histogram circuit 17 (see FIG. 6B). In the comparator 18, the frequency at each time of the histogram computed in the histogram circuit 17 is compared with the threshold value stored in the fourth memory 19. In the comparator 18, when a frequency larger than the threshold value is in existence, the timing control signal d is outputted. Accordingly, in an example shown in FIG. 6B, since the frequency at the time t3 becomes larger than the threshold value, the timing control signal d is outputted from the comparator 18 at the time t3. In the correction value detection circuit 20, the time when the frequency becomes larger than the threshold value (the time t3 in the example shown in FIG. 6B) and the optimum reception time stored in the fifth memory 21 are compared with each other only when the timing control signal d is inputted from the comparator 18. A timing correction value e which sets the initial value of the counter 14 of the reception window control circuit 13 at 0 in case the time when the frequency becomes larger than the threshold value is the same as the optimum reception time, sets the initial value of the counter 14 at −1 in case the time when the frequency becomes larger than the threshold value is earlier than the optimum reception time, and sets the initial value of the counter 14 at +1 in case the time when the frequency becomes larger than the threshold value is later than the optimum reception time is outputted from the correction value detection circuit 20 to the counter 14.

As a result, for example, in case the time when the frequency becomes larger than the threshold value is time t4 when the optimum reception time stored in the fifth memory 21 is time t3, the timing correction value e which sets the initial value of the counter 14 at −1 is outputted from the correction value detection circuit 20. Therefore, the reception time detected by the reception timing detection circuit 8 the next time becomes earlier than the actual reception time by one sample time interval and shows time t3 which is the optimum reception time. On the other hand, in case the time when the frequency becomes larger than the threshold value is time t2 when the optimum reception time stored in the fifth memory 21 is time t3, the timing correction value e which sets the initial value of the counter 14 at +1 is outputted from the correction value detection circuit 20. Therefore, the reception time detected by the reception timing detection circuit 8 next time gets later than the actual reception time by one sample time interval and shows time t3 which is the optimum reception time.

Since there is provided, in the synchronization equipment of the present embodiment, the timing correction value detection circuit 16 which detects the histogram of the reception time and corrects the lag of the reception time when a frequency larger than the threshold value is included, it is possible to detect the reception time of the lead wave accurately even when both the lead wave and the delay wave are in existence.

(The third embodiment)

A synchronization equipment according to a third embodiment of the present invention is different from the synchronization equipment according to the first embodiment shown in FIG. 3 in that a reception timing detection circuit is structured as described hereunder.

Figure 7:
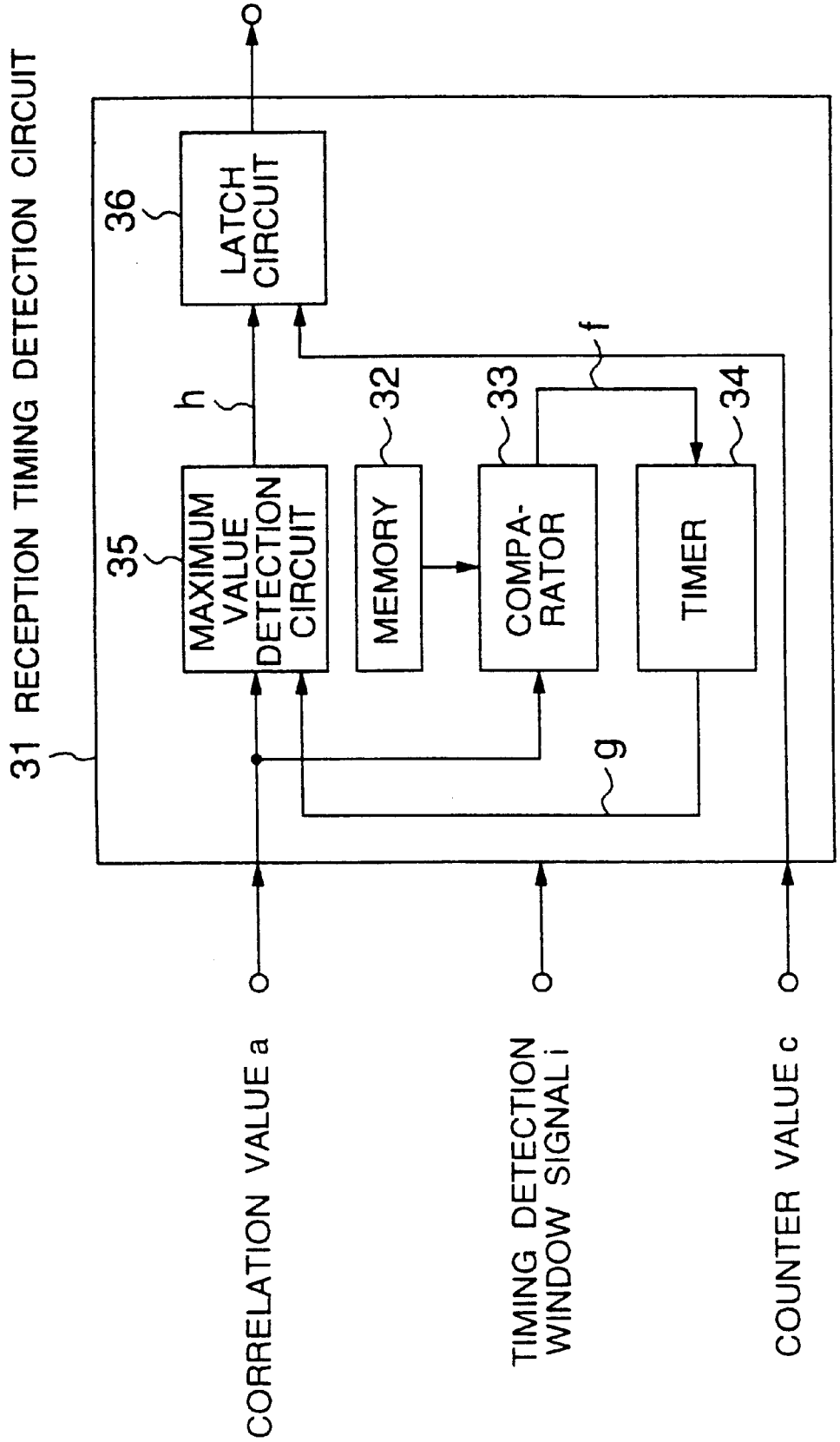
FIG. 7 is a block diagram of a synchronization equipment according to a third embodiment of the present invention.

In the synchronization equipment according to the present embodiment, a reception timing detection circuit 31 includes a memory 32, a comparator 33, a timer 34, a maximum value detection circuit 35 and a latch circuit 36 as shown in FIG. 7. In the memory 32, a predetermined threshold value is stored. In the comparator 33, a correlation value a sent from the correlation circuit 3 and the predetermined threshold value stored in the memory 32 are compared with each other, and 1 is outputted as a control signal f when the correlation value a is larger than the predetermined threshold value, and 0 is outputted as the control signal f when the correlation value a is smaller than the predetermined threshold value. In the timer 34, when 1 is inputted as the control signal f from the comparator 33, a control signal q which operates the maximum value detection circuit 35 only for a certain period (timer value) is outputted. In the maximum value detection circuit 35, when the newly inputted correlation value a is larger than the maximum value of the correlation values in the past, 1 is outputted as a control signal h only for a period shorter than one sample time interval, and the newly inputted correlation value a is also replaced with the maximum value of the correlation values in the past. In the latch circuit 36, a count value c of the counter 14 of the reception window control circuit 13 is taken in and held at the rise edge of the control signal h from the maximum value detection circuit 35. Besides, the maximum value of the correlation values in the past stored in the maximum value detection circuit 35 is reset to 0 at a fall edge of an output signal (a timing detection window signal i) of the decoder 15.

Figure 8A:
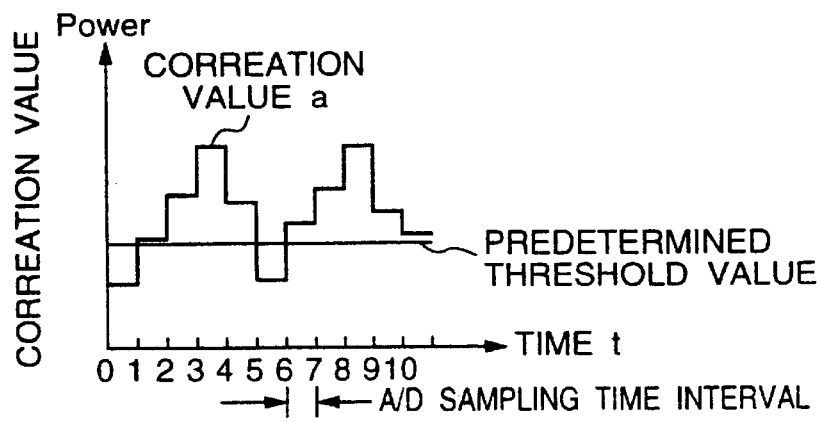
FIGS. 8A to 8E are timing charts for explaining the operation of the synchronization equipment shown in FIG. 7.

The operation of the synchronization equipment according to the present embodiment will be described taking a case that the correlation value a and the predetermined threshold value stored in the memory 32 have a mutual relationship shown in FIG. 8A and the width of a timing detection window signal i is 4 as an example.

Figure 8B:
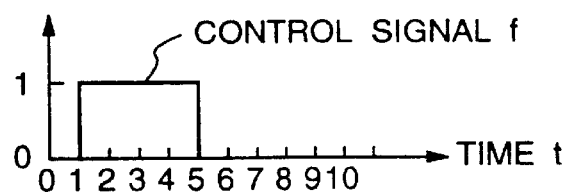
Figure 8C:
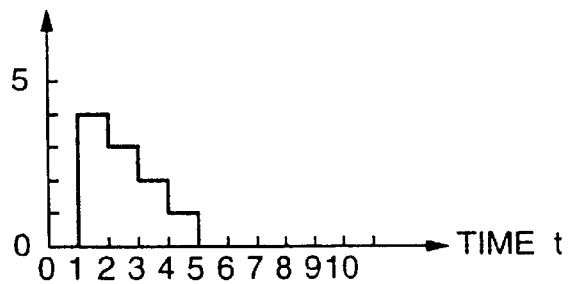
Figure 8D:
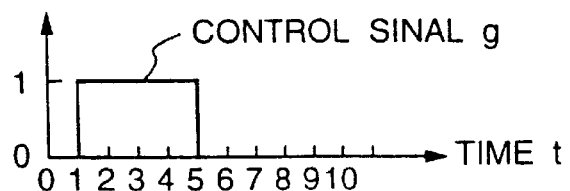

Since the correlation value a is smaller than the predetermined threshold value at time t0, 0 is outputted from the comparator 33 as the control signal f (see FIG. 8B). Further, since the timer value of the timer 34 is 0 (see FIG. 8C), 0 is outputted from the timer 34 as the control signal q (see FIG. 8D). As a result, the maximum value detection circuit 35 is not operated.

Figure 8E:
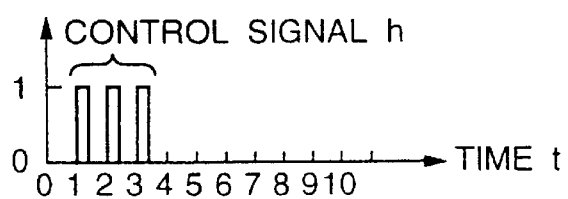

Since the correlation value a becomes larger than the predetermined threshold value at time t1, 1 is outputted from the comparator 33 as the control signal f (see FIG. 8B). In the timer 34, since the timer value is set to 4 which is the width of the timing detection window signal i at the rise edge of the control signal f from the comparator 33 (see FIG. 8C), 1 is outputted from the timer 34 as the control signal q (see FIG. 8D). As a result, the maximum value detection circuit 35 starts the operation, and the maximum value of the correlation values in the past (0 in this case since it has been reset at the fall edge of the timing detection window signal i) and the correlation value a computed at the time t1 are compared with each other. Since the correlation value a computed at the time t1 is larger than 0, the control signal h having a pulse width shorter than one sample time interval is outputted from the maximum value detection circuit 35 (see FIG. 8E), and, in the maximum value detection circuit 35, the correlation value a computed at the time t1 is replaced with 0 which is the maximum value of the correlated values in the past. In the latch circuit 36, the counter value c is taken in and held at the rise edge of the control signal h.

Since the correlation value a is larger than the predetermined threshold value at time t2, 1 is continued to be outputted from the comparator 33 as the control signal f (see FIG. 8B). In the timer 34, the timer value is decremented and set to 3 (see FIG. 8C). Since the timer value is not 0 as before, however, 1 is continued to be outputted from the timer 34 as the control signal q (see FIG. 8D). As a result, the maximum value detection circuit 35 continues the operation, and the maximum value of the correlation values in the past (in this case, the correlation value a computed at the time t1) and the correlation value a computed at the time t2 are compared with each other. Since the correlation value a computed at the time t2 is larger than the correlation value a computed at the time t1, the control signal h having a pulse width shorter than one sample time interval is outputted from the maximum value detection circuit 35 (see FIG. 8E), and the correlation value a computed at the time t2 is replaced with the correlation value a computed at the time t1 in the maximum value detection circuit 35 at the same time. In the latch circuit 36, the counter value c is taken in and held at the rise edge of the control signal h.

At time t3, 1 is continued to be outputted from the comparator 33 as the control signal f (see FIG. 8B) because the correlation value a is larger than the predetermined threshold value. In the timer 34, the timer value is decremented and set to 2 (see FIG. 8C). Since the timer value is not 0 as before, however, 1 is continued to be outputted from the timer 34 as the control signal q (see FIG. 8D). As a result, the maximum value detection circuit 35 continues the operation, and the maximum value of the correlation values in the past (in this case, the correlation value a computed at the time t2) and the correlation value a computed at the time t3 are compared with each other. Since the correlation value a computed at the time t3 is larger than the correlation value a computed at the time t2, the control signal h having a pulse width shorter than one sample time interval is outputted from the maximum value detection circuit 35 (see FIG. 8E), and the correlation value a computed at the time t3 is replaced with the correlation value a computed at the time t2 in the maximum value detection circuit 35. In the latch circuit 36, the counter value c is taken in and held at the rise edge of the control signal h.

At time t4, since the correlation value a is larger than the predetermined threshold value, 1 is continued to be outputted from the comparator 33 as the control signal f (see FIG. 8B). In the timer 34, the timer value i decremented and set to 1 (see FIG. 8C). Since the timer value is not 0 as before, however, 1 is continued to be outputted from the timer 34 as the control signal q (see FIG. 8D). As a result, the maximum value detection circuit 35 continues the operation, and the maximum value among the correlation values in the past (in this case, the correlation value a computed at the time t3) and the correlation value a computed at the time t4 are compared with each other. Since the correlation value a computed at the time t4 is smaller than the correlation value a computed at the time t3, 0 is outputted from the maximum value detection circuit 35 as the control signal h (see FIG. 8E). At this time, the correlation value a computed at the time t4 is not replaced with the correlation value a computed at the time t3 in the maximum value detection circuit 35. Further, the latch circuit 36 continues to hold the counter value c taken in at the time t3.

Since the correlation value a is smaller than the predetermined threshold value at time t5, 0 is outputted from the comparator 33 as the control signal f (see FIG. 8B). In the timer 34, the timer value is decremented and set to 0 (see FIG. 8C). As a result, 0 is outputted from the timer 34 as the control signal q (see FIG. 8D), and the operation of the maximum value detection circuit 35 is sustained. Further, the latch circuit 36 continues to hold the count value c taken in at the time t3.

Since 0 is continued to be outputted from the timer 34 as the control signal q from time t6 to time t10 (see FIG. 8D), the maximum value detection circuit 35 will never restart the operation. Further, the latch circuit 36 continues to hold the count value c taken in at the time t3. As a result, it is possible to detect the reception time of the lead wave accurately.

As described above, in the synchronization equipment according to the present embodiment, the maximum value detection circuit 35 of the reception timing detection circuit 31 detects the reception time when the correlation value is at the maximum only during a certain period of time specified by the timer 34 from the time when the known symbol has been received and the latch circuit 36 holds the reception time after the lapse of the pointed time. Thus, it is possible to detect the reception time of the lead wave accurately even when the lead wave and the delay wave are in existence.

(The fourth embodiment)

A synchronization equipment according to a fourth embodiment of the present invention is different from the synchronization equipment according to the first embodiment shown in FIG. 3 in that a reception timing detection circuit is structured as described hereunder.

Figure 9:
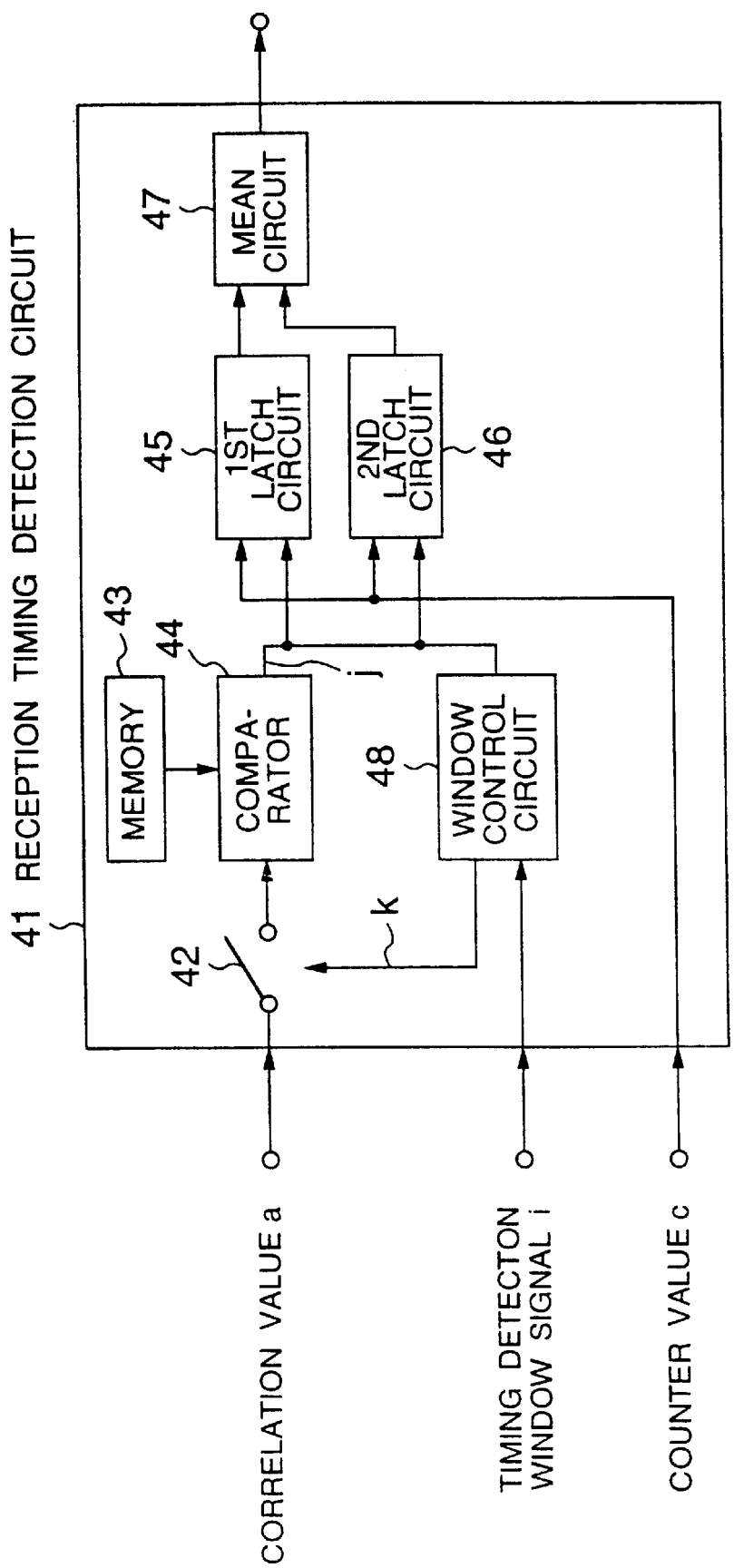
FIG. 9 is a block diagram of a synchronization equipment according to a fourth embodiment of the present invention.

In the synchronization equipment according to the present embodiment, a reception timing detection circuit 41 includes a switch 42, a memory 43, a comparator 44, first and second latch circuits 45 and 46, a mean circuit 47 and a window control circuit 48 as shown in FIG. 9. A predetermined threshold value is stored in the memory 43. In the comparator 44, a correlation value a sent from the correlation circuit 3 through the switch 42 and the predetermined threshold value stored in the memory 43 are compared with each other, and 1 is outputted as a control signal i when the correlation value a is larger than the predetermined threshold value and 0 is outputted as the control signal j when the correlation value a is smaller than the predetermined threshold value. In the first latch circuit 45, the counter value c of the counter 14 of the reception window control circuit 13 is taken in and held at the rise edge of the control signal i from the comparator 44. In the second latch circuit 46, the counter value c is taken in and held at the fall edge of the control signal i from the comparator 44. In the mean circuit 47, a mean value of the counter value c held in the first latch circuit 45 and the counter value c held in the second latch circuit 46 is obtained, and the obtained means value is used as the detection time of the known symbol. A switch control signal k which controls ON/OFF of the switch 42 is formed in the window control circuit 48. Here, the switch control signal k is made 0 at the fall edge of the control signal j from the comparator 44 and is made 1 by the output signal (timing detection window signal i) of the decoder 15. The switch 42 is turned OFF when the switch control signal k at 0 is inputted from the window control circuit 48 and is turned ON when the control signal k at 1 is inputted.

The operation of the synchronization equipment according to the present embodiment will be described taking a case that the correlation value a and the predetermined threshold value stored in the memory 43 have a mutual relationship shown in FIG. 10A and the width of the timing detection window signal i is 4 as an example.

In the window control circuit 48, the switch control signal k is set to 1 at time t0 by the timing detection window signal i (see FIG. 10C). As a result, the switch 42 is brought to an on-state (closed state).

In the comparator 44, the correlation value a which is sent from the correlation circuit 3 to the reception timing detection circuit 41 and the predetermined threshold value stored in the memory 43 are compared with each other. In this case, since the correlation value a is smaller than the predetermined threshold value (see FIG. 10A), 0 is outputted from the comparator 44 as the control signal j (see FIG. 10B). As a result, the counter value c is never taken ir the first latch circuit 45 and the second latch circuit 46, and the outputs thereof become unstable (see FIGS. 10D to 10G). With this, the output of the mean circuit 47 also becomes unstable.

Since the control signal d from the comparator 44 has no fall edge at time t1, the switch control signal k is remained as it is 1 (see FIG. 10C). As a result, the switch 42 remains ON (closed state). In the comparator 44, the correlation value a which is sent from the correlation circuit 3 to the reception timing detection circuit 41 and the predetermined threshold value stored in the memory 43 are compared with each other. In this case, since the correlation value a is larger than the predetermined threshold value (see FIG. 10A), 1 is outputted from the comparator 44 as the control signal j (see FIG. 10B). As a result, in the first latch circuit 45, the counter value c (=1) is taken in at the rise edge of the control signal i (see FIGS. 10D and 10E). On the other hand, in the second latch circuit 46, the counter value c is never taken in, but the output thereof remains as it is unsettled (see FIGS. 10F and 10G). Although the counter value c (=1) is held in the first latch circuit 45, the output signal of the second latch circuit is unsettled. Therefore, the output of the mean circuit 47 remains as it is unsettled.

Since the control signal d from the comparator 44 has no fall edge from time t2 to time t4, the switch control signal k is left as it is 1 (see FIG. 10C). As a result, the switch 42 remains in an ON-state (closed state). In the comparator 44, the correlation value a which is sent from the correlation circuit 3 to the reception timing detection circuit 41 and the predetermined threshold value stored in the memory 43 are compared with each other. In this case, since the correlation value a is larger than the predetermined threshold value (see FIG. 10A), 1 is continued to be outputted from the comparator 44 as the control signal j (see FIG. 10B). As a result, in the first latch circuit 45, the counter value c (=1) which was taken in at the time t1 is continued to be held (see FIGS. 10D and 10E). On the other hand, in the second latch circuit 46, the counter value c is never taken in, but the output thereof remains as it is unsettled (see FIGS. 10F and 10G). Although the counter value c (=1) which was taken in at the time t1 is continued to be held in the first latch circuit 45, the output signal of the second latch circuit remains as it is unsettled.

Since the switch 42 remains as it is ON at the time t5, the correlation value a sent from the correlation circuit 3 to the reception timing detection circuit 41 and the predetermined threshold value stored in the memory 43 are compared with each other. In this case, since the correlation value a is smaller than the predetermined threshold value (see FIG. 10A), the control signal j outputted from the comparator 44 is changed from 1 to 0 (see FIG. 10B). As a result, since a fall edge is produced in the control signal j from the comparator 44 and the switch control signal k is changed from 1 to 0 in the window control circuit 48 (see FIG. 10C), the switch 42 is brought to an OFF state (open state). Further, in the first latch circuit 45, the counter value c (=1) which was taken in at the time t1 continues to be held (see FIGS. 10D and 10E), but the counter value c (=5) is taken in at the fall edge of the control signal j from the comparator 44 in the second latch circuit 46 (see FIGS. 10F and 10G). With this, a mean value (=3) of the counter value c (=1) taken into the first latch circuit 45 at the time t1 and the counter value c (=5) taken into the second latch circuit 46 is obtained for the output of the mean circuit 47.

The switch control signal k remains as it is at 0 from time t6 to time t10 (see FIG. 10C). Accordingly, the correlation value a is never inputted to the comparator 44, but 0 is inputted to the comparator 44 in place of the correlation value a. Therefore, the control signal d outputted from the comparator 44 remains as it is 0 (see FIG. 10B). As a result, the counter value c (=1) which was taken in at the time t1 continues to be held in the first latch circuit 45, and the counter value c (=5) which was taken in at the time t5 continues to be held in the second latch circuit 46. With this, the mean value (=3) obtained at the time t5 continues to be outputted from the mean circuit 47.

As described above, in the synchronization equipment according to the present embodiment, the mean value of the first time when the correlation value a has become larger than the predetermined threshold value stored in the memory 43 for the first time, detected in the first latch circuit 45 of the reception timing detection circuit 41, and the second time when the correlation value a becomes smaller than the predetermined threshold value for the first time after the first time, detected in the second latch circuit 46, is obtained in the mean circuit 47, and this mean value is adopted as the reception time of the known symbol. Therefore, even when both the lead wave and the delay wave are in existence, it is possible to detect the reception time of the lead wave accurately.

Besides, in the synchronization equipment according to the present embodiment, since detection of the maximum value such as the synchronization equipment according to the third embodiment described above is not performed, it is possible to reduce the circuit scale when it is realized with a hardware or the number of operation steps when it is realized with a software. Further, since the same results are obtainable with a synchronization equipment according to the present embodiment and the synchronization equipment according to the above-mentioned third embodiment when the correlation value is symmetrical with respect to the reception time of the maximum value, it may safely be said that the synchronization equipment according to the present embodiment which is simple to be realized is preferable. When the correlation value is not symmetrical with respect to the reception time of the maximum value, however, the synchronization equipment according to the above-mentioned third embodiment can detect the reception time of the known reception symbol (the time when the correlation value reaches the maximum) more accurately.

In the first to fourth embodiments of the present invention described above, since the detection timing is adapted to the lead wave when both the lead wave and the delay wave are received, it is possible to remove the effect by the delay wave thereby to detect the reception time of the lead wave accurately.

(The fifth embodiment)

A synchronization equipment according to a fifth embodiment of the present invention is different from the synchronization equipment according to the first embodiment shown in FIG. 3 in that a reception timing detection circuit is structured as described hereunder.

In the synchronization equipment according to the present embodiment, a reception timing detection circuit 208 includes, as shown in FIG. 11, an interpolator 209 for interpolating the correlation value a which is sent from the correlation circuit 3, a first memory 210 in which a correlation value A after interpolation is stored, an address control circuit 211 for controlling the time and order for reading out the correlation value A after interpolation of the first memory 210, a second memory 213 in which a predetermined threshold value is stored, a comparator 212 for comparing the correlation value A after interpolation read out of the first memory 210 with the predetermined threshold value stored in the second memory 213, and outputting a control signal B when the correlation value A after interpolation is larger than the predetermined threshold value, and a latch circuit 214 for taking in and holding a counter value c which is sent from a reception window control circuit 13 and an interpolation number D which is sent from the address control circuit 211 when the control signal B is sent from the comparator 212.

The operation of the synchronization equipment according to the present embodiment will be described taking a case that it is assumed that interpolation in the interpolator 209 is a three-times primary candidate, and the reception time of a known symbol is detected between the time t0 to the time t6 as an example.

In the conventional synchronization equipment shown in FIG. 1, when it is assumed that the correlation value outputted from the correlation circuit 103 and the predetermined threshold value stored in the memory 110 have a relationship shown in FIG. 12A, the output signal of the comparator 109 shows a high level during a period when the correlation value is larger than the threshold value (viz. from the time t3 to the time t4) as shown in FIG. 12B. Thus, in this synchronization equipment, the detection accuracy of the reception timing is determined univocally by a sampling time interval T in the first and second A/D converters 101 and 102.

As against the above, in the synchronization equipment according to the present embodiment, the correlation value a (see a broken line shown in FIG. 12C) outputted from the correlation circuit 3 is interpolated to three times in the interpolator 209, and the correlation value A after interpolation is stored in the first memory 210. When the address control circuit 211 controls so as to read out the correlation value A after interpolation from the first memory 210 at the 0th, the first and the second of respective times (see a solid line shown in FIG. 12C), 0.1 and 2 are outputted from the address control circuit 211 to the latch circuit 214.

Now, when it is assumed that the correlation value A after interpolation and the predetermined threshold value stored in the second memory 213 have mutual relationship shown in FIG. 12C, the control signal B outputted from the comparator 212 shows a high level during the period from an interpolation number D=2 at the time t3 when the correlation value A after interpolation becomes larger than the predetermined threshold value to an interpolation number D=0 at time t4 (see FIG. 12D). In the latch circuit 214, the counter value c and the interpolation number D are taken in and held at the rise edge of the control signal B. With this, the detection time of the known symbol detected in the synchronization equipment according to the present embodiment is expressed by (3+2/3)T=11T/3. Besides, the detection time tmg of the known symbol detected in the synchronization equipment according to the present embodiment is generally expressed by the following expression.

$$tmg=(n+m/N)\cdot T \quad (4)$$

Here, n is a counter number,

N is a rate of interpolation, m is an interpolation number, and

T is a sampling the interval between the

A/D converters 1 and 2.

Accordingly, in the synchronization equipment according to the present embodiment, it is possible to detect the reception timing with higher accuracy as compared with the conventional synchronization equipment. Further, the timing lag in the synchronization equipment according to the present embodiment becomes ±T/(2N) as against that the timing lag in the conventional synchronization equipment becomes ±T/2.

(The sixth embodiment)

Figure 13:
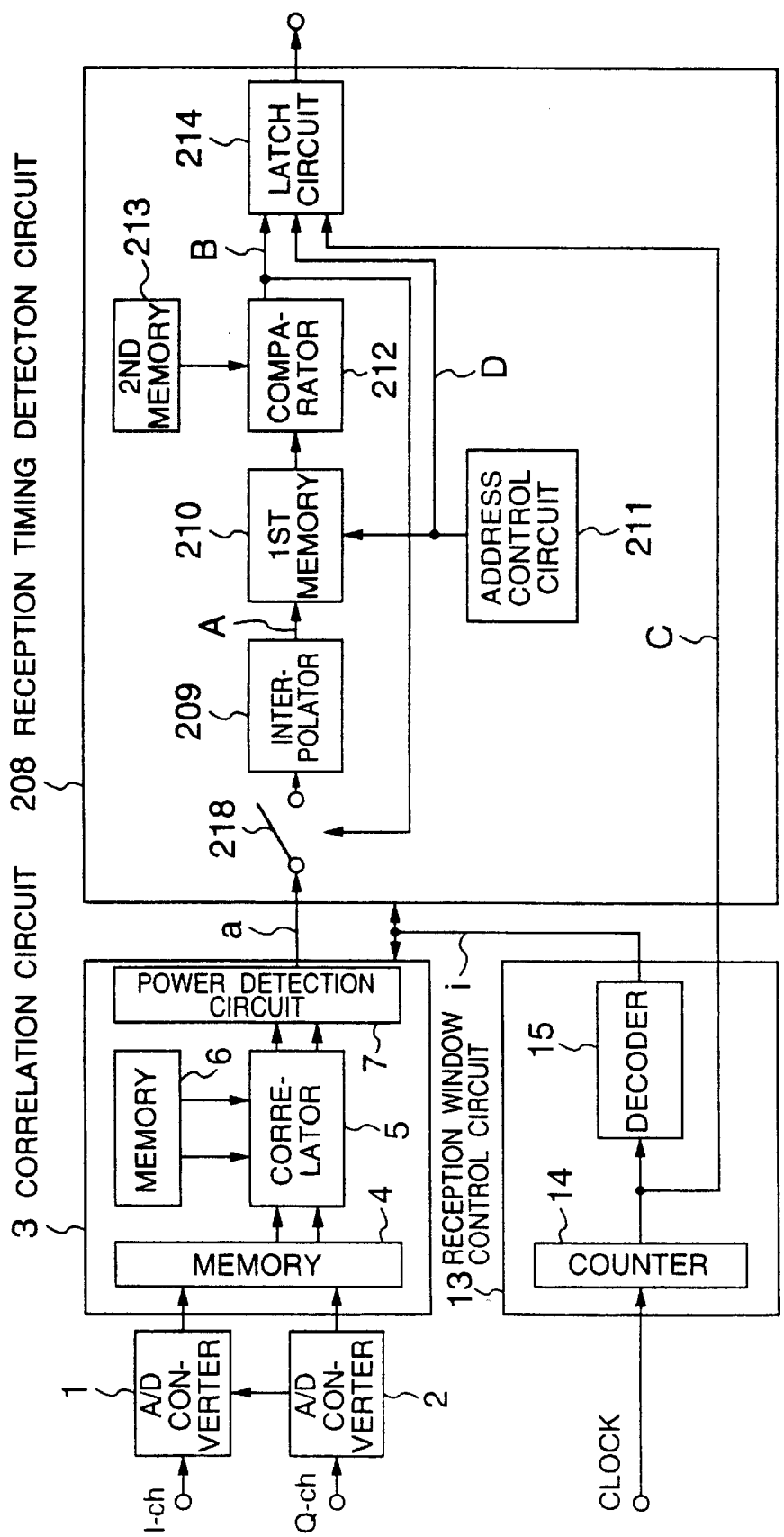
FIG. 13 is a block diagram of a synchronization equipment according to a sixth embodiment of the present invention.

A synchronization equipment according to a sixth embodiment of the present invention is different from the synchronization equipment according to the fifth embodiment shown in FIG. 11 in that a reception timing detection circuit 208A includes a switch 218 opening and closing of which is controlled by a control signal B outputted from the comparator 212 provided before the interpolator 209 as shown in FIG. 13.

When the lead wave (a desired wave) and the delay wave are included in the received wave, a correlation value a computed in the correlation circuit 3 changes with the passage of time as shown in FIG. 14A for instance. Here, the lead wave is a received signal which reaches most immediately directly from a transmitting station, and the delay wave is a received signal which reaches late after reflected by a building, a mountain and so on. In an electric wave environment where such a delay wave exists, there are a cases when the lead wave is received principally, a case when the delay wave is received principally, and a case when both the lead wave and the delay wave are received.

Since only the lead wave is received when there is no delay wave, it is possible to cope with the circumstances sufficiently with the synchronization equipment according to the above-mentioned fifth embodiment. When the delay wave is in existence, however, since the time when the correlation value a becomes larger than the predetermined threshold value is adopted as the reception timing in the synchronization equipment according to the above-mentioned fifth embodiment, the reception time of the lead wave is detected when the lead wave is received principally, the reception time of the delay wave is detected when the delay wave is received principally, and both the reception time of the lead wave and the reception time of the delay wave are detected when both the lead wave and the delay wave are received. In such a case, when the reception timing is corrected based on the detected reception time, the reception timing is controlled a little to the delay wave between the lead wave and the delay wave. Therefore, the reception timing after control becomes a reception timing when the performance can be least demonstrated when the delay wave is going to be removed with an equalizer or the like. The synchronization equipment according to the present embodiment is capable of adapting the reception timing to the lead wave surely in order to give full display to the performance of an equalizer or the like.

The operation of the reception timing detection circuit 208A when the reception time of the known symbol is detected during time t0 to time t6 will be described hereinafter assuming that the interpolator 209 performs three times primary interpolation similarly to the case of the synchronization equipment according to the above-mentioned fifth embodiment.

When the time showing that the sampling time is n and the interpolation number D is m in the first and second A/D converters 1 and 2 is expressed by t(n−m), the switch 218 is closed on the rise edge of the output signal (a timing detection window signal i) of the decoder 15 of the receiving window control circuit 13 at time t(0-0). As a result, the correlation value a computed in the correlation circuit 3 is inputted to the interpolator 209 and interpolation processing is performed, and stored thereafter in the first memory 210. That which has the interpolation number D of zero among the correlation values A after interpolation stored in the first memory 210 is selected in the address control circuit 211 and inputted to the comparator 212. Since the selected correlation value A after interpolation is smaller than the predetermined threshold value stored in the second memory 213 as shown in FIG. 14B, the control signal B outputted from the comparator 212 remains as it is at a low level. Accordingly, in the latch circuit 214, the counter value c and the interpolation number D are never taken in.

At time t(0-1), that which has the interpolation number D of 1 among the correlation values A after interpolation stored in the first memory 210 is selected by the address control circuit 211 and inputted into the comparator 212. Since this selected correlation value A after interpolation is smaller than the predetermined threshold value stored in the second memory 213 as shown in FIG. 14B, the control signal B outputted from the comparator 212 remains as it is at a low level. Thus, in the latch circuit 214, the counter value c and the interpolation number D are never taken in.

At time t(0-2), that which has the interpolation number D of 2 among the correlation values A after interpolation stored in the first memory 210 is selected by the address control circuit 211 and inputted into the comparator 212. Since this selected correlation value A after interpolation is smaller than the predetermined threshold value stored in the second memory 213 as shown in FIG. 14B, the control signal E outputted from the comparator 212 remains as it is at a low level. Thus, in the latch circuit 214, the counter value c and the interpolation number D are never taken in.

At time from time t(1-0) to time t(1-2), since the correlation value A after interpolation is smaller than the predetermined threshold value stored in the second memory 213 as shown in FIG. 14B, the operation similar to that from the time t(0-0) to the time t(0-2) is performed.

At time from t(2-0) to t(2-1), since the correlation value A after interpolation is smaller than the predetermined threshold value stored in the second memory 213 as shown in FIG. 14B, the operation similar to that at the above-mentioned time from time t(0-0) to time t(0-1) is performed. At time t(2-2), however, since the correlation value A after interpolation becomes larger than the predetermined value stored in the second memory 213 as shown in FIG. 14B, the control signal B outputted from the comparator 212 shows a high level. Accordingly, in the latch circuit 214, the counter value c (which indicates the time t2 in this cases) and the interpolation number D (which indicates 2 in this case) are taken in and held at the rise edge of the control signal B. Further, the switch 218 is opened at the rise edge of the control signal B, and the switch 218 remains as it is opened thereafter. As a result, from time t(3-0) to time t(6-2), the correlation value a computed in the correlation circuit 3 is not inputted into an interpolator 209, but the control signal B outputted from the comparator 212 shows a low level (see FIG. 14C). As a result, time t(2-2) is outputted from the latch circuit 214 as the receiving time of the known symbol after completion of timing detection window. With this, it is possible to detect the reception timing from the above-mentioned expression (4) with the accuracy of (2+2/3)T=8T/3.

As described above, in the synchronization equipment according to the present embodiment, it is possible to detect the reception timing of the lead wave surely even when both the lead wave and the delay wave are in existence in addition to the effect of synchronization equipment according to the above-mentioned fifth embodiment. Incidentally, since the correlation value A after interpolation also exceeds the predetermined threshold value at the time t(4-2) as shown in FIG. 14B in the synchronization equipment according to the above-mentioned fifth embodiment, the latch circuit 214 is operated at the time t(4-2). As a result, since reception timings of both the lead wave and the delay wave are detected as shown in FIG. 14D, the reception timing is locked midway between the lead wave and the delay wave.

(The seventh embodiment)

Figure 15:
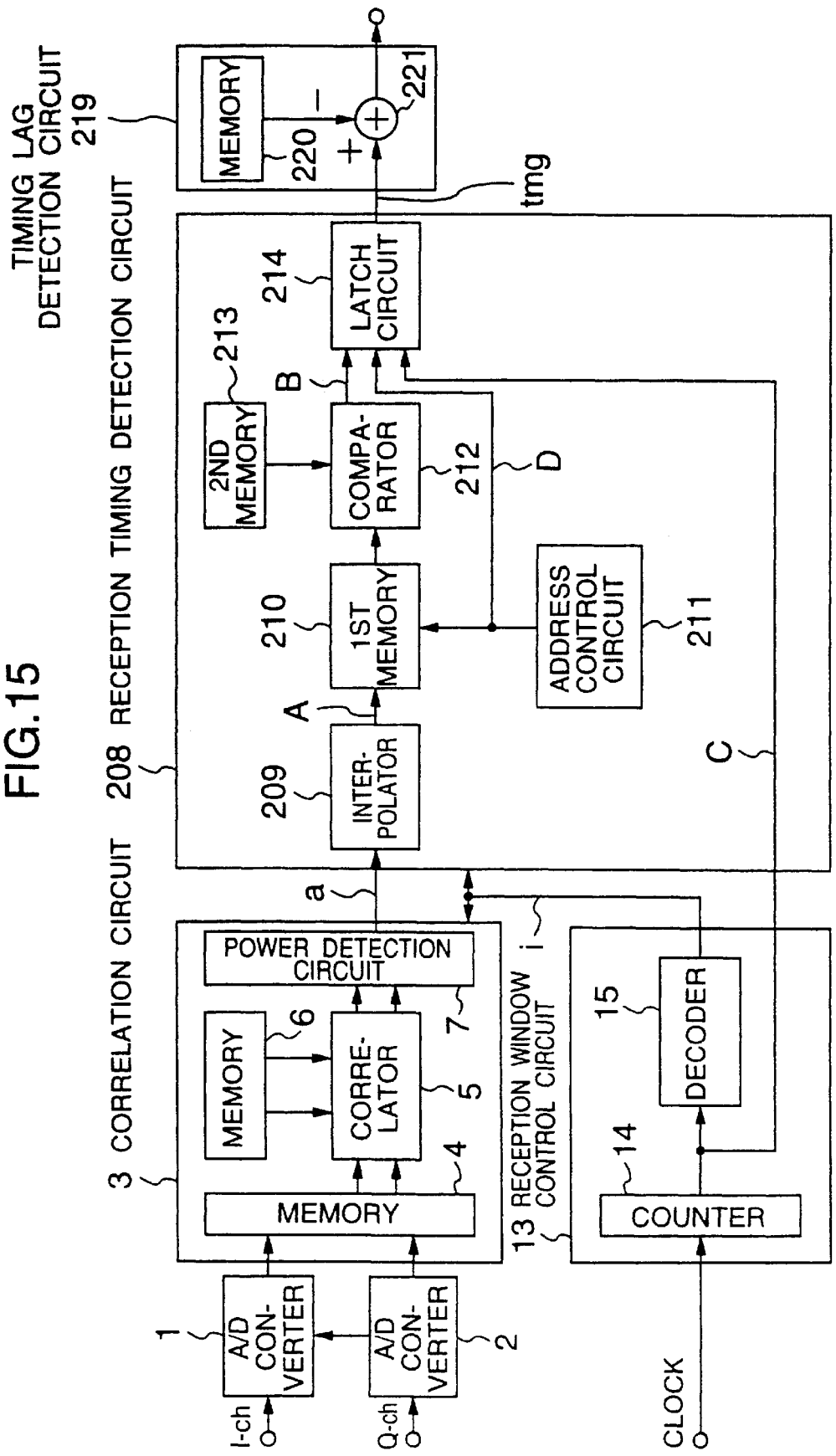
FIG. 15 is a block diagram of a synchronization equipment according to a seventh embodiment of the present invention.

A synchronization equipment according to a seventh embodiment of the present invention is different from the synchronization equipment according to the sixth embodiment shown in FIG. 11 in that a timing lag detection circuit 219 is provided on the output side of the reception timing detection circuit 208 as shown in FIG. 15. Here, the timing lag detection circuit 219 includes a memory 220 in which the optimum reception time is stored, and an adder 221 for obtaining the difference between the optimum reception time stored in the memory 220 and the reception time tmg detected in the reception timing detection circuit 208.

As described previously, the reception time tmg of the known symbol detected in the reception timing detection circuit 208 is expressed with the counter value c and the interpolation number D. Namely, when it is assumed that the counter value c of the counter 14 is n, the interpolation number D is m, the rate of interpolation is N, and the sampling time interval between the first and second A/D converters 1 and 2 is T, it is possible to obtain the reception time tmg with the above-mentioned expression (4). When it is assumed that the optimum reception time stored in the memory 220 is xT, the timing correction value A can be obtained from the following expression.

$$A = tmg - xT = (n + m/N - x)T \quad (4)$$

The operation of the expression (4) is performed in the adder 221. Namely, a negative timing correction value A is obtained when the reception time tmg of the known symbol is earlier than the optimum reception time xT, and a positive timing correction value A is obtained when the reception time tmg of the known symbol is later than the optimum reception time xT. Accordingly, in the synchronization equipment according to the present embodiment, it is possible to detect the reception timing lag from the output of the synchronization equipment with a simple structure.

Besides, when the timing lag detection circuit 219 is provided on the output side of the reception timing detection circuit 208A of the synchronization equipment according to the sixth embodiment shown in FIG. 13, similar effects are also obtainable.

(The eighth embodiment)

A synchronization equipment according to an eighth embodiment of the present invention is different from the synchronization equipment according to the seventh embodiment shown in FIG. 15 in that an output signal H of the timing lag detection circuit 219 is inputted to a counter 14A of a receiving window control circuit 13A so as to correct timing automatically. In timing correction in the present embodiment, the timing lag by the correlation value B after interpolation is corrected. Therefore, the timings of the first and second A/D converters 1 and 2 and a timing detection window signal f outputted from the decoder 15 are corrected with precision of T/N by using a clock having a frequency of a value obtained by multiplying sampling frequencies of the first and second A/D converters 1 and 2 by a rate of interpolation N as the clock inputted to the counter 14A. The counter 14A is operated at a period of reception intervals of the known symbol. It is possible to adjust the reception time backward and forward by adjusting the counter 14A.

A method of timing correction in the synchronization equipment according to the present embodiment will be described hereinafter with reference to FIGS. 17A to 17C. Besides, it is assumed that the period of the counter 14A is 11T on the convenience of explanation.

(1) When timing correction is not made:

As shown in FIG. 17A, the synchronization equipment is operated at the period of the counter 14A (i.e. 11T).

(2) When timing correction is made backward:

For example, the reception time tmg of the known symbol is detected earlier than the optimum reception time (stored in the memory 220) by 1T, the output signal H of the timing lag detection circuit 219 shows a timing lag detection value a of −1T. Since the whole is shifted backward as timing correction at this time, the initial value of the counter 14A is set to −1T which is the timing lag detection value when the counter value c becomes (10+2/3)T as shown in FIG. 17B.

(3) When timing correction is made frontward:

For example, when the reception time tmg of the known symbol is detected later than the optimum reception time (stored in the memory 220) by 1T, the output signal H of the timing lag detection circuit 219 shows a timing lag detection value of +1T. Since the whole is shifted frontward as timing correction at this time, the initial value of the counter 14A is set to +1T which is a timing lag detection value when the counter value c shows (10+2/3)T as shown in FIG. 17C.

As described above, in the synchronization equipment according to the present embodiment, it is possible to correct the timing lag of a synchronizing signal automatically with a simple structure using the output signal H of the timing lag detection circuit 219 provided on the output side of the reception timing detection circuit 208.

Besides, when the timing lag detection circuit 219 is provided on the output side of the reception timing detection circuit 208A of the synchronization equipment according to the sixth embodiment shown in FIG. 13, it is also possible to structure a synchronization equipment in which similar effects are obtainable.

In the synchronization equipments according to the fifth to eighth embodiments of the present invention described above, it is possible to detect the known symbol accurately, and to detect the reception timing with high accuracy by detecting the reception time of the known symbol after interpolating the correlation value computed in the correlation circuit.

What is claimed is:

1. A synchronization equipment for performing correlation processing between a first known pattern included in a received signal and a second known pattern to detect reception timing of said received signal, said synchronization equipment comprising:

correlation value computing means for computing a correlation value between said first known pattern and said second known pattern;

reception timing detection means; and reception window control means for sending a reception time to said correlation value computing means and said reception timing detection means, wherein:

said correlation value computing means computes said correlation value at every said reception time; and said reception timing detection means compares said correlation value with a predetermined threshold value, determines said reception time when said correlation value becomes larger than said predetermined threshold value to be a reception timing of said received signal, suspends the comparison between said correlation value and said predetermined threshold value after determination of said reception time, and holds said reception time determined as said reception timing.

2. A synchronization equipment according to claim 1, wherein said reception timing detection means comprises:

a switch to which said correlation value is inputted from said correlation value computing means;

a first memory in which said predetermined threshold value is stored;

a comparator for comparing said correlation value inputted from said switch with said predetermined threshold value, and outputting an output signal when said correlation value becomes larger than said predetermined threshold value; and a latch circuit for taking in and holding said reception time sent from said reception window control means by the output signal of said comparator, wherein:

said switch is brought to an open state by the output signal of said comparator.

3. A synchronization equipment according to claim 2, further comprising timing correction value detection means for drawing up a histogram of said reception time held in said latch circuit, comparing a frequency of the reception time in said histogram with another predetermined threshold value, and generating a timing correction value for correcting said reception time sent by said reception window control means.

4. A synchronization equipment according to claim 3, wherein said timing correction value detection means further comprises:

a histogram drawing up circuit for drawing up said histogram of said reception time held in said latch circuit;

a second memory in which said another predetermined threshold value is stored;

a comparator for comparing the frequency of said reception time in said histogram drawn up by said histogram drawing up circuit with said another predetermined threshold value; and a timing correction value generating circuit for generating said timing correction value for correcting said reception time sent by said reception window control means in accordance with a reception time when said frequency exceeds said another predetermined threshold value.

5. A synchronization equipment for performing correlation processing between a first known pattern included in a received signal and a second known pattern to detect reception timing of said received signal, said equipment comprising:

correlation value computing means for computing a correlation value between said first known pattern and said second known pattern;

reception timing detection means; and reception window control means for sending a reception time to said correlation value computing means and said reception timing detection means, wherein:

said correlation value computing means computes said correlation value at every said reception time; and said reception timing detection means compares said correlation value with a predetermined threshold value, detects a first reception time when said correlation value becomes larger than said predetermined threshold value for a first time and a second reception time when said correlation value has become smaller than said predetermined threshold value for a first time after said first reception time, obtains a mean value of said first reception time and said second reception time, and holds said mean value.

6. A synchronization equipment according to claim 1, wherein said reception timing detection means comprises:

a switch for receiving said correlation value from said correlation value computing means;

a memory in which said predetermined threshold value is stored;

a comparator for comparing said correlation value inputted from said switch with said predetermined threshold value, and outputting a first output signal when said correlation value becomes larger than said predetermined threshold value for a first time and outputting a second output signal when said correlation value becomes smaller than said predetermined threshold value for a first time after said first reception time;

a first latch circuit for taking in and holding said reception time which is sent from said reception window control means by the first output signal of said comparator;

a second latch circuit for taking in and holding said reception time which is sent from said reception window control means by the second output signal of said comparator;

a mean circuit for obtaining a mean value of said reception time held in said first latch circuit and said reception time held in said second latch circuit; and a window control circuit for outputting a switch control signal for bringing said switch into an open state when said second output signal of said comparator is inputted.

7. A synchronization equipment for performing correlation processing between a first known pattern included in a received signal and a second known pattern to detect reception timing of said received signal, said equipment comprising:

correlation value computing means for computing a correlation value between said first known pattern and said second known pattern;

reception timing detection means; and reception window control means for sending a reception time to said correlation value computing means and said reception timing detection means, wherein:

said correlation value computing means computes said correlation value at every said reception time; and said reception timing detection means performs an interpolation operation with respect to said correlation value to obtain an interpolated correlation value, performs a comparison operation to compare said interpolated correlation value and said predetermined threshold value, and determines said reception time when said interpolated correlation value becomes larger than said predetermined threshold value to be a reception timing of said received signal.

8. A synchronization equipment according to claim 7, wherein said reception timing detection means comprises:

an interpolator for performing said interpolation operation with respect to said correlation value;

a first memory in which said interpolated correlation value is stored;

an address control circuit for controlling read-out of said interpolated correlation value from said first memory while corresponding to an interpolation number;

a second memory in which said predetermined threshold value is stored;

a comparator for comparing said interpolated correlation value read out of said first memory with said predetermined threshold value stored in said second memory, and outputting an output signal when said interpolated correlation value becomes larger than said predetermined threshold value; and a latch circuit for taking in and holding said reception time which is sent from said reception window control means and said interpolation number which is sent from said address control circuit by the output signal of said comparator.

9. A synchronization equipment according to claim 7, wherein said reception timing detection means comprises means for suspending the comparison between said interpolated correlation value and said predetermined value after determination of the reception time by said reception timing detection means, and holding said reception time which is determined to be said reception timing.

10. A synchronization equipment according to claim 8, wherein said reception timing detection means further comprises a switch provided on an input side of said interpolator, and opening and closing of said switch is controlled by an output signal of said comparator.

11. A synchronization equipment according to claim 7, further comprising timing lag detection means provided on an output side of said reception timing detection means, said timing lag detection means comprising:

storage means in which an optimum reception time is stored; and adding means for obtaining a difference between the reception time held by said reception timing detection means and said optimum reception time.

12. A synchronization equipment according to claim 9, further comprising timing lag detection means provided on an output side of said reception timing detection means said timing lag detection means comprising:

storage means in which an optimum reception time is stored; and adding means for obtaining a difference between the reception time held by said reception timing detection means and said optimum reception time.

13. A synchronization equipment according to claim 11, wherein said reception window control means comprises a counter for counting a clock in which an initial value is set in accordance with an output signal of said timing lag detection means.

14. A synchronization equipment according to claim 12, wherein said reception window control means comprises a counter for counting a clock in which an initial value is set in accordance with an output signal of said timing lag detection means.

* * * * *